United States Patent
Lal et al.

(10) Patent No.: US 12,328,469 B2
(45) Date of Patent: Jun. 10, 2025

(54) SYSTEMS AND METHODS FOR PROVIDING SIMULTANEOUS DISPLAY OF PORTIONS OF A MEDIA ASSET

(71) Applicant: Adeia Guides Inc., San Jose, CA (US)

(72) Inventors: Dhananjay Lal, Englewood, CO (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/368,700

(22) Filed: Sep. 15, 2023

(65) Prior Publication Data
US 2025/0097512 A1 Mar. 20, 2025

(51) Int. Cl.
*H04N 21/431* (2011.01)
*H04N 21/443* (2011.01)
*H04N 21/466* (2011.01)
*H04N 21/482* (2011.01)

(52) U.S. Cl.
CPC ..... *H04N 21/4312* (2013.01); *H04N 21/4438* (2013.01); *H04N 21/4668* (2013.01); *H04N 21/4821* (2013.01)

(58) Field of Classification Search
None
See application file for complete search history.

(56) References Cited

U.S. PATENT DOCUMENTS

| | | | |
|---|---|---|---|
| 9,350,934 B2 | 5/2016 | Lang et al. | |
| 9,374,605 B2 | 6/2016 | Barton | |
| 10,063,911 B1* | 8/2018 | Obara | H04N 21/4223 |
| 11,122,325 B1* | 9/2021 | Gupta | H04N 21/231 |
| 11,627,364 B1* | 4/2023 | Gupta | H04N 21/4331 |
| | | | 725/14 |
| 2014/0101707 A1* | 4/2014 | Kishore | H04N 21/8456 |
| | | | 725/86 |
| 2014/0105575 A1* | 4/2014 | Nishikawa | H04N 21/472 |
| | | | 386/241 |
| 2017/0332036 A1* | 11/2017 | Panchaksharaiah | H04N 5/45 |
| 2017/0332125 A1* | 11/2017 | Panchaksharaiah | |
| | | | H04N 21/8549 |

(Continued)

OTHER PUBLICATIONS

Amaresh et al. "Video Captioning using Deep Learning: An Overview of Methods, Datasets and Metrics," 2019 International Conference on Communication and Signal Processing (ICCSP), Chennai, India, pp. 0656-0661 (2019).

(Continued)

*Primary Examiner* — Alexander Q Huerta
(74) *Attorney, Agent, or Firm* — Haley Guiliano LLP

(57) ABSTRACT

Systems and methods are described for receiving a first request to access a media asset; identifying a first portion of the media asset to be provided for display based on the first request, wherein the first portion of the media asset corresponds to a first timepoint of the media asset; identifying a second portion of the media asset corresponding to a second timepoint of the media asset, wherein the second timepoint occurs prior to the first timepoint of the media asset; receiving a second request to cause simultaneous display of the first portion of the media asset corresponding to the first timepoint and the second portion of the media asset corresponding to the second timepoint; and in response to receiving the second request, providing for simultaneous display the first portion of the media asset and the second portion of the media asset.

20 Claims, 12 Drawing Sheets

(56) References Cited

U.S. PATENT DOCUMENTS

| | | | | |
|---|---|---|---|---|
| 2017/0332139 | A1* | 11/2017 | Blake | H04N 21/431 |
| 2018/0199080 | A1* | 7/2018 | Jackson, Jr. | H04N 21/2187 |
| 2020/0097731 | A1 | 3/2020 | Gupta et al. | |
| 2020/0177971 | A1* | 6/2020 | Puniyani | H04N 21/8549 |
| 2020/0344437 | A1 | 10/2020 | Panchaksharaiah et al. | |
| 2021/0136447 | A1 | 5/2021 | Daw et al. | |
| 2022/0174354 | A1 | 6/2022 | Dhiman et al. | |
| 2023/0016521 | A1* | 1/2023 | Dhiman | H04N 21/2747 |
| 2023/0088988 | A1* | 3/2023 | Krishnamoorthi | H04N 21/4532 725/46 |
| 2023/0118824 | A1* | 4/2023 | Jackson, Jr. | H04N 21/2187 725/38 |
| 2023/0199258 | A1 | 6/2023 | Chandrashekar et al. | |

OTHER PUBLICATIONS

Del Fabro et al., "State-of-the-art and future challenges in video scene detection: a survey." Multimedia systems 19:427-454 (2013).

Hu et al. "Probabilistic future prediction for video scene understanding." Computer Vision—ECCV 2020: 16th European Conference, Glasgow, UK, Aug. 23-28, 2020, Proceedings, Part XVI 16. Springer International Publishing (2020).

Kill Bill vol. 1 [Split Screen], https://www.youtube.com/watch?v=dWI4G9PB31c&t=30s, Dec. 17, 2014.

MLB.TV Help Center: How to Use Multi-view, https://www.mlb.com/live-stream-games/help-center/subscription-access-how-to-use-multi-view.

Tiwari et al., "A survey of recent work on video summarization: approaches and techniques," Multimed Tools Appl 80, 27187-27221 (2021) https://doi.org/10.1007/s11042-021-10977-y.

Workie et al., "Digital video summarization techniques: A survey," Int. J. Eng., Technol, 9, pp. 81-85 (2020) https://www.researchgate.net/publication/338526880Digital_Video_Summarization_Techniques_A_Survey.

Malcolm McMillan, "I got YouTube TV—and now I can't live without this feature—Key plays make sure you ever miss that one shining moment," https://www.tomsguide.com/opinion/i-got-youtube-tv-and-now-i-cannot-live-without-this-feature, Aug. 7, 2022.

\* cited by examiner

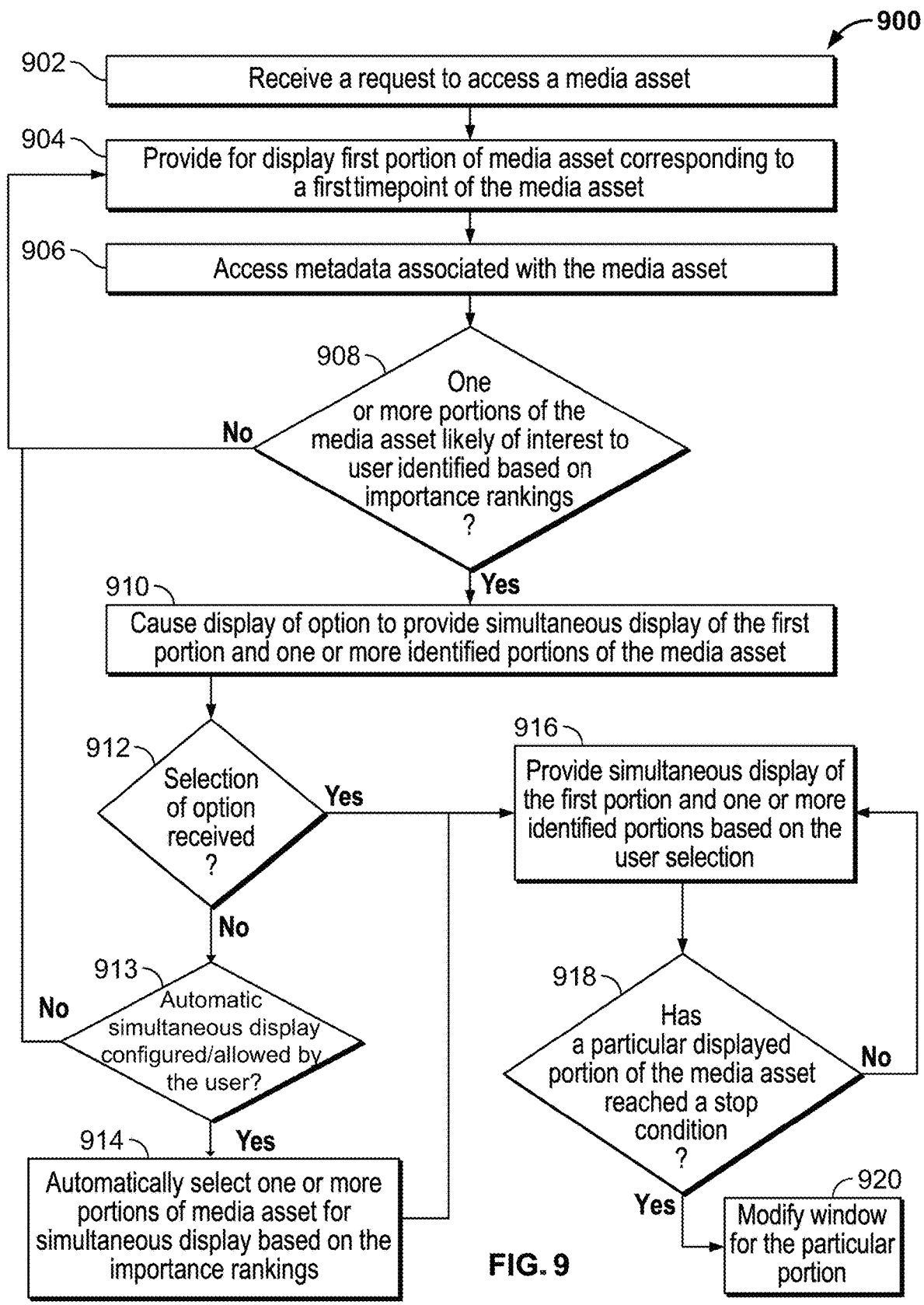

SYSTEMS AND METHODS FOR PROVIDING SIMULTANEOUS DISPLAY OF PORTIONS OF A MEDIA ASSET

BACKGROUND

The present disclosure is directed to systems and methods for simultaneously displaying a first portion of a media asset and a second portion of the media asset. More particularly, the first portion of the media asset corresponds to a first timepoint of the media asset, and the second portion of the media asset corresponds to a second timepoint that occurs prior to the first timepoint of the media asset.

SUMMARY

Modern media distribution systems enable a user to access more media content than ever before, and on more devices than ever before. As an example, many users enjoy consuming broadcasts of certain live events (e.g., sporting events or entertainment events such as the Oscars) from their homes, at homes of friends or family, or at a public place. As another example, time-shifting technologies, which enable a user to request to delay a broadcast of a live event to a later time than a real-time start of the broadcast, have also enhanced the user experience by allowing the user to consume the media content at a time that is convenient for the user. However, if a user joins a live program after the start time, he or she may desire to catch up on portions of the live program that he or she missed prior to joining.

In one approach, when a user requests to access a live program after its start time, the user is provided an option to rewind the live program or restart the program from the beginning, e.g., a content provider may have automatically, or based on a user request, buffered or recorded the content from the start time. However, while this allows the user to view the content from the beginning, the user may, while viewing the content from the beginning, miss out on what is occurring in a real time (or near real time) live portion of the content. Moreover, the user may waste his or her time (and computing and networking resources of the user's devices, the content provider server's, and transmission network) rewinding or fast-forwarding through the live program in an effort to identify important moments that the user missed, and/or the content provider may expend its storage resources by saving recorded copies of the program for users.

In another approach, a user may use two different devices, where the user watches the live portion of the live program on a first device, and an earlier portion of the live program on a second device. However, this may consume unnecessary bandwidth and/or computing resources and may be inefficient, not to mention potentially inconvenient and frustrating for the user. Moreover, such approach requires two or more separate devices within a viewing space.

To help overcome these drawbacks, systems, methods and apparatuses are disclosed herein for receiving a first request to access a media asset. Implementing any of the one or more of the techniques described herein, a system or systems may be configured to identify a first portion and second portion of the media asset to be provided for display based on the first request. For example, the first portion of the media asset may correspond to a first timepoint of the media asset, and the second portion of the media asset may correspond to a second timepoint of the media asset that occurs prior to the first timepoint of the media asset. The system may be configured to receive a second request to cause simultaneous display of the first portion of the media asset corresponding to the first timepoint and the second portion of the media asset corresponding to the second timepoint and in response to receiving the second request, and simultaneously display the first portion of the media asset and the second portion of the media asset.

Such aspects enable providing a user a simultaneous display of a first portion of a media asset (e.g., a live portion of a live media stream of the media asset) and a second portion of the media asset (e.g., one or more of an important event having occurred earlier in the media asset prior to the user accessing the media asset, a beginning of the media asset, or any other suitable portion of the media asset). By accommodating such time-shifted stream(s) (and/or a live portion of the stream), the disclosed techniques allow the user to simultaneously catch up with prior events of the media asset as well as stay up to date with a current portion of the media asset, enabling the user to gain a holistic understanding of what has happened in the live event. In some embodiments, by providing the multiple portions of the media asset to the user simultaneously, computing and/or networking resources may be conserved as opposed to a user having to utilize two or more devices to access such different portions of the media asset.

In some embodiments, the systems, methods and apparatuses disclosed herein may identify for user selection portion(s) of the media asset occurring earlier than a current portion (e.g., based on analyzing metadata and/or audiovisual characteristics and/or social media activity) that are likely to be of interest to the user or are otherwise significant, rather than the user having to rewind or fast-forward through the media asset to independently determine important portions of the content that he or she missed.

In some embodiments, the systems, methods and apparatuses disclosed herein may be configured to access metadata of a plurality of portions of the media asset occurring at timepoints prior to the first timepoint of the media asset. The plurality of portions of the media asset may comprise a second portion of the media asset and the system may generate, based on the metadata and for each of the plurality of portions of the media asset, an importance ranking or importance score. The system may be further configured to, based on the importance ranking for the second portion of the media asset, provide for display a selectable option and receive the second request to cause simultaneous display of the first portion and the second portion in response to receiving selection of the selectable option.

In some embodiments, the metadata is generated based on at least one of analyzing audio of the second portion of the media asset, analyzing video of the second portion of the media asset, or analyzing social media content related to the second portion of the media asset. Implementation of this embodiment may employ real-time processing for analyzing a video of a live event in near real-time to identify key moments and generate metadata (e.g., a natural language description of the moment). In some embodiments, the metadata is stored in a key moments table. Storing the pertinent information in a key moments table allows the server to present multiple viewing options for the live event to a user, and it allows the user to select one or more time-shifted configuration views for presentation. As described in more detail below, the system disclosed herein may present a subset of key moments based on user preferences or interests, whether explicit or inherent.

In some embodiments, the second request to cause simultaneous display of the first portion and second portion is received from a user associated with a user profile. The system may be configured to access preferences of the user profile; determine, based on comparing at least a portion of the accessed metadata to the preferences of the user profile, that the second portion of the media asset is likely to be of interest to the user; and, based on determining that the second portion of the media asset is likely to be of interest to the user, provide for display a selectable option.

In some embodiments, providing for display the selectable option to cause simultaneous display of the first portion and the second portion may comprise displaying a plurality of selectable icons respectively corresponding to a plurality of portions of the media asset. In some embodiments, simultaneously displaying the first portion of the media asset and the second portion of the media asset is performed based on receiving selection of a first icon of the plurality of icons corresponding to the first portion of the media asset and a second icon of the plurality of icons corresponding to the second portion of the media asset.

In some embodiments, providing for display the selectable option to cause simultaneous display of the first portion and the second portion may comprise, while displaying the first portion of the media asset corresponding to the first timepoint of the media asset, displaying a plurality of selectable icons respectively corresponding to a plurality of portions of the media asset occurring prior to the first timepoint of the media asset, and providing for simultaneous display the first portion of the media asset and the second portion of the media asset is performed based on receiving selection of an icon of the plurality of icons corresponding to the second portion of the media asset.

In some embodiments, the first timepoint corresponds to a live portion of the media asset, and the second timepoint corresponds to a beginning of the media asset, and providing for simultaneous display the first portion of the media asset and the second portion of the media asset may comprise causing simultaneous playing of the media asset starting from the live portion of the media asset and starting from the beginning of the media asset at a same computing device.

In some embodiments, providing for simultaneous display the first portion of the media asset and the second portion of the media asset may comprise providing for simultaneous display a first window at a first region of a display and a second window at a second region of the display. For example, the first window may display the first portion of the media asset, and the second window may display the second portion of the media asset. In some embodiments, the second portion of the media asset may correspond to video content corresponding to the second timepoint of the media asset, and the system may be configured to determine, based on a current timepoint of the second portion of the media asset, to modify the second window of the display, and modify the second window of the display.

In some embodiments, determining, based on the current timepoint of the second portion of the media asset, to modify the second window of the display may comprise determining that the second portion of the media asset has concluded or that the current timepoint of the video content of the second portion of the media asset corresponds to the first timepoint of the first portion of the media asset. In some embodiments, modifying the second window of the display may comprise removing the second window from the display.

In some embodiments, the system may be configured to identify a third portion of the media asset corresponding to a third timepoint of the media asset occurring prior to the first timepoint of the media asset. For example, the system may modify the second region of the display by causing the third portion of the media asset to be provided for display at the second region of the display after the second portion of the media asset has concluded.

In some embodiments, the first portion of the media asset and the second portion of the media asset may be provided for display based on a single manifest file. Such aspects may obviate having to create and transmit multiple manifest files to a user device for each portion of the media asset that is provided for simultaneous display. In some embodiments, by providing a single dynamic manifest file to facilitate simultaneously display of multiple portions of a media asset, strain on computing and networking resources of the user's device, the content provider, and the transmission network may be minimized, thereby providing for a lower latency experience.

In some embodiments, the first portion of the media asset may be provided for display based on a first manifest file, and the second portion of the media asset may be provided for display based on a second manifest file. In some embodiments, providing such separate manifest files may enable the system to create supplemental content insertion points dynamically related to a view of the media asset that starts at a key moment.

In some embodiments, the system may be configured to identify supplemental content to be provided for display during the first portion of the media asset and prevent display of the supplemental content during the second portion of the media asset.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 9 is a flowchart of a detailed illustrative process for causing simultaneous display of portions of a media asset, in accordance with some embodiments of this disclosure.

DETAILED DESCRIPTION

Figure 1A:
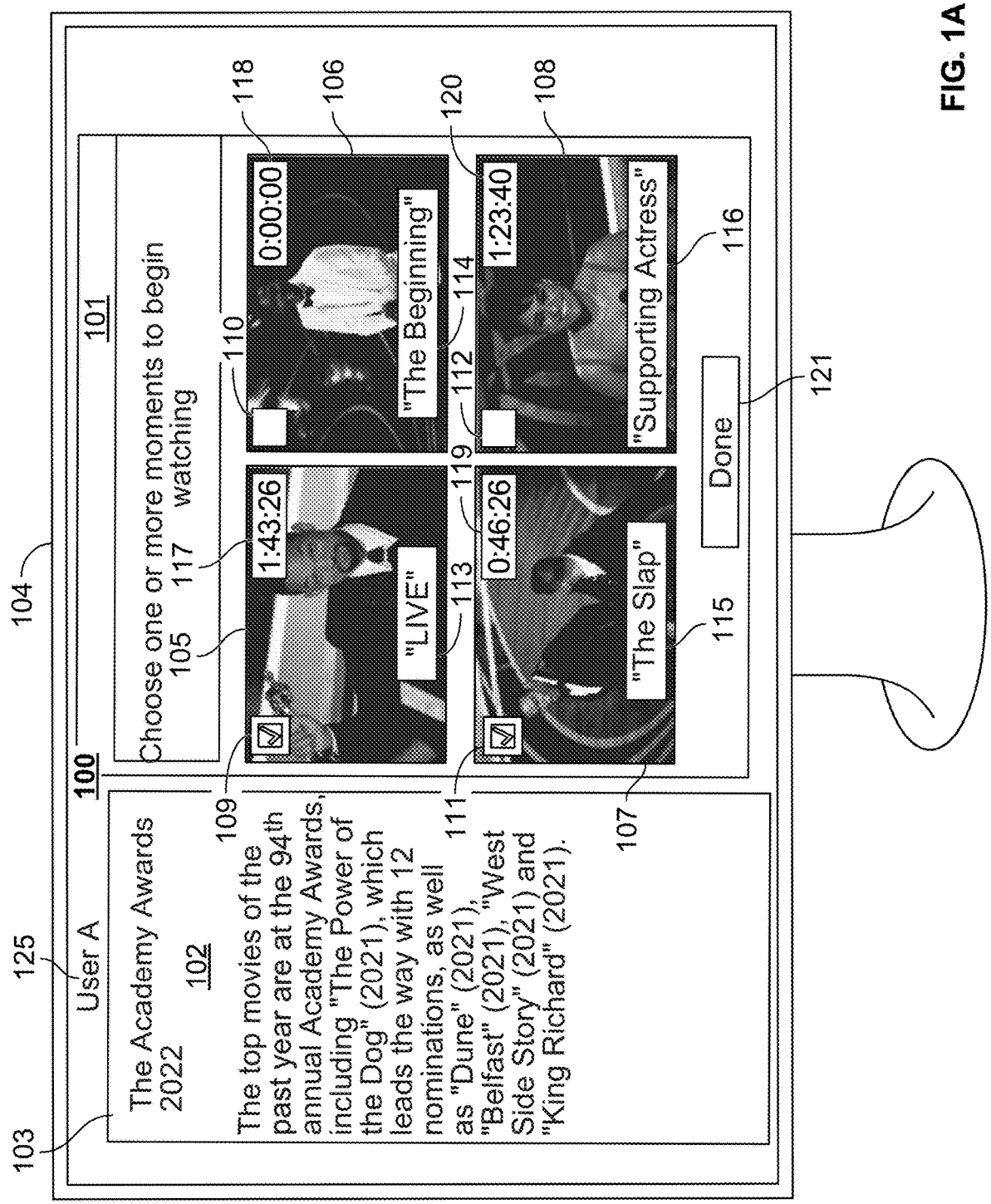
FIGS. 1A-1C show illustrative user interfaces for receiving a request to cause simultaneous display of portions of a media asset, in accordance with some embodiments of this disclosure.

FIG. 1A shows an illustrative user interface 100 for receiving a request to cause simultaneous display of portions of a media asset 103, in accordance with some embodiments of this disclosure. User interface 100 comprises content summary section 102 and portion selection interface 101. As shown in FIG. 1A, portion selection interface 101 may comprise selectable icons 105, 106, 107, 108 corresponding to respective portions of media asset 103 (e.g., "The Academy Awards 2022"), and selection indicators 109, 110, 111, 112 corresponding to selectable icons 105, 106, 107, 108, respectively, which indicate whether a user (e.g., associated with user profile 125) is requesting the corresponding portion of media asset 103 to be displayed. Portion selection interface 101 may comprise titles 113, 114, 115, 116 of the respective portions of media asset 103 corresponding to selectable icons 105, 106, 107, 108. In some embodiments, portion selection interface 101 may comprise timepoints 117, 118, 119, 120 indicating a time during the duration of media asset 103 that is associated with the corresponding portion of media asset 103. In some embodiments, each of selectable icons 105, 106, 107, 108 can be a thumbnail or a tile or any other suitable icon or any combination thereof.

In some embodiments, a media application may be executed at least in part on computing device 104 and/or at one or more remote servers and/or at or distributed across any of one or more other suitable computing device(s) (e.g., computing devices 607, 608, 610 of FIG. 6 and/or media content source 602 of FIG. 6 and/or content server 604 of FIG. 6) in communication over any suitable number and/or types of networks (e.g., the Internet). The media application may be configured to perform the functionalities (or any suitable portion of the functionalities) described herein. In some embodiments, the media application may be a stand-alone application, or may be incorporated (e.g., as a plugin) as part of any suitable application, e.g., one or more broadcast content provider applications, broadband provider applications, live content provider applications, media asset provider applications, extended reality (XR) applications, video or image or electronic communication applications, social networking or social media applications, image or video capturing and/or editing applications, or any other suitable application(s), or any combination thereof.

In some embodiments, the media application may be installed at or otherwise provided to a particular computing device, may be provided via an application programming interface (API), or may be provided as an add-on application to another platform or application. In some embodiments, software tools (e.g., one or more software development kits, or SDKs) may be provided to any suitable party, to enable the party to implement the functionalities described herein.

In some embodiments, the media application may display media asset 103 at computing device 104, e.g., based on a request to access media asset 103 (and/or a particular portion thereof) and/or a request to simultaneously display at least two portions of media asset 103. Computing device 104 may comprise or correspond to a mobile device such as, for example, a smartphone or tablet; a laptop computer; a personal computer; a display device associated with local/in-premise computing resources and/or cloud computing resources or any other suitable display device; a desktop computer; a smart television; a non-smart, "dumb" television, display or monitor and/or thin client; a smart watch or wearable device; smart glasses; a stereoscopic display; a wearable camera; XR glasses; XR goggles; an XR head-mounted display (HMD); near-eye display device; a set-top box; a streaming media device; any other suitable computing device; or any combination thereof.

As referred to herein, the terms "media asset" and "content" may be understood to mean electronically consumable user assets, such as television programming, as well as pay-per-view programs, on-demand programs (as in video-on-demand (VOD) systems), live content, Internet content (e.g., streaming content, downloadable content, Webcasts, etc.), video clips, 3D-content, audio, content information, pictures, GIFs, rotating images, documents, playlists, websites, articles, books, electronic books, blogs, advertisements, chat sessions, social media, applications, games, and/or any other media or multimedia and/or combination of the same. In some embodiments, the media asset may be provided for display from a broadcast or stream received at a computing device, or from a recording stored in a memory of the computing device and/or a remote server.

Figure 2A:
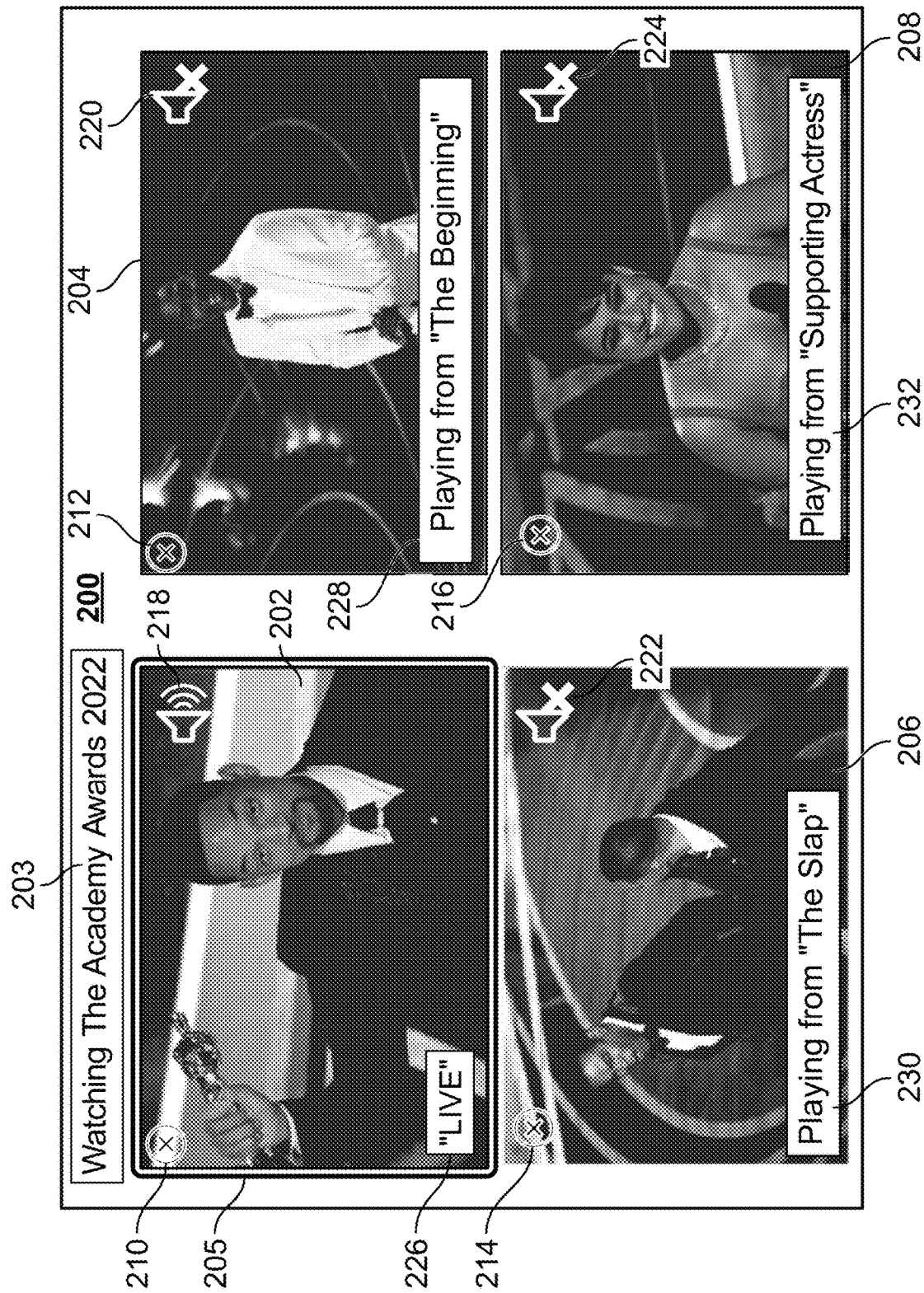
FIGS. 2A-2B show illustrative user interfaces for causing simultaneous display of portions of a media asset, in accordance with some embodiments of this disclosure.
Figure 2B:
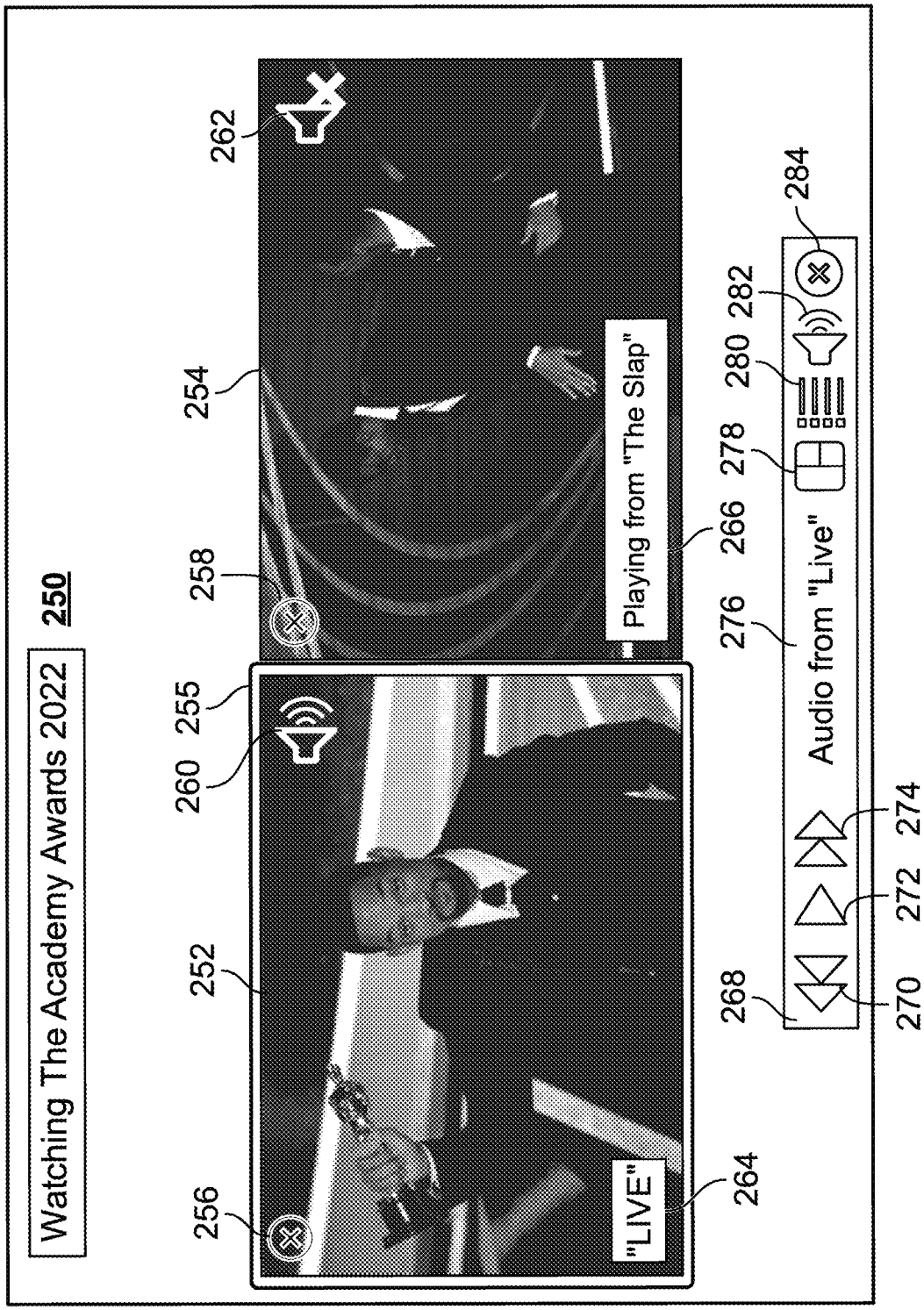

In some embodiments, based on receiving selection of icon 121, the media application may cause simultaneous display of portions selected by the user (e.g., the "LIVE" portion indicated at 113 and "The Slap" portion indicated at 115, as shown in FIG. 2B. In some embodiments, content summary section 102 may comprise the title of media asset 103, a description of media asset 103, associated performers (e.g., actors, hosts, contestants, or any other suitable performer or personnel, or any combination thereof) featured in media asset 103, original release date/time, and any other suitable descriptor of or associated with media asset 103, or any combination thereof.

As a non-limiting example, media asset 103 may correspond to a live event such as an awards show (e.g., "The Academy Awards 2022") in which a plurality of portions thereof been identified as portions of media asset 103 corresponding to key moments in the live event, e.g., "The Slap" (e.g., represented by selectable icon 107 and title 115) and "Supporting Actress" (e.g., represented by selectable icon 108 and title 116). As referred to herein, the term "key moment" may be understood to comprise important portions in the live event, the beginning of the live event, the live portion (e.g., the real-time or closest to real-time available portion) of the live event, or any other suitable portion of the live event, or any combination thereof. As described in more detail below, the media application may identify important or noteworthy or viral portions of the live event based on analyzing audiovisual attributes of media asset 103, based on metadata (e.g., manually entered by an operator and/or automatically generated using computer-implemented techniques) related to media asset 103, based on social media posts or other social media data related to media asset 103, viewership data of media asset 103, preferences of user profile 125 associated with the user consuming media asset 103, or based on any other suitable factors, or any combination thereof. In some embodiments, the media application may determine that portions of media asset 103 correspond to or comprise key moments based on receiving or accessing a manifest file (e.g., manifest file 300 of FIG. 3) and/or a data structure (e.g., key moments table 400 of FIG. 4).

Figure 1B:
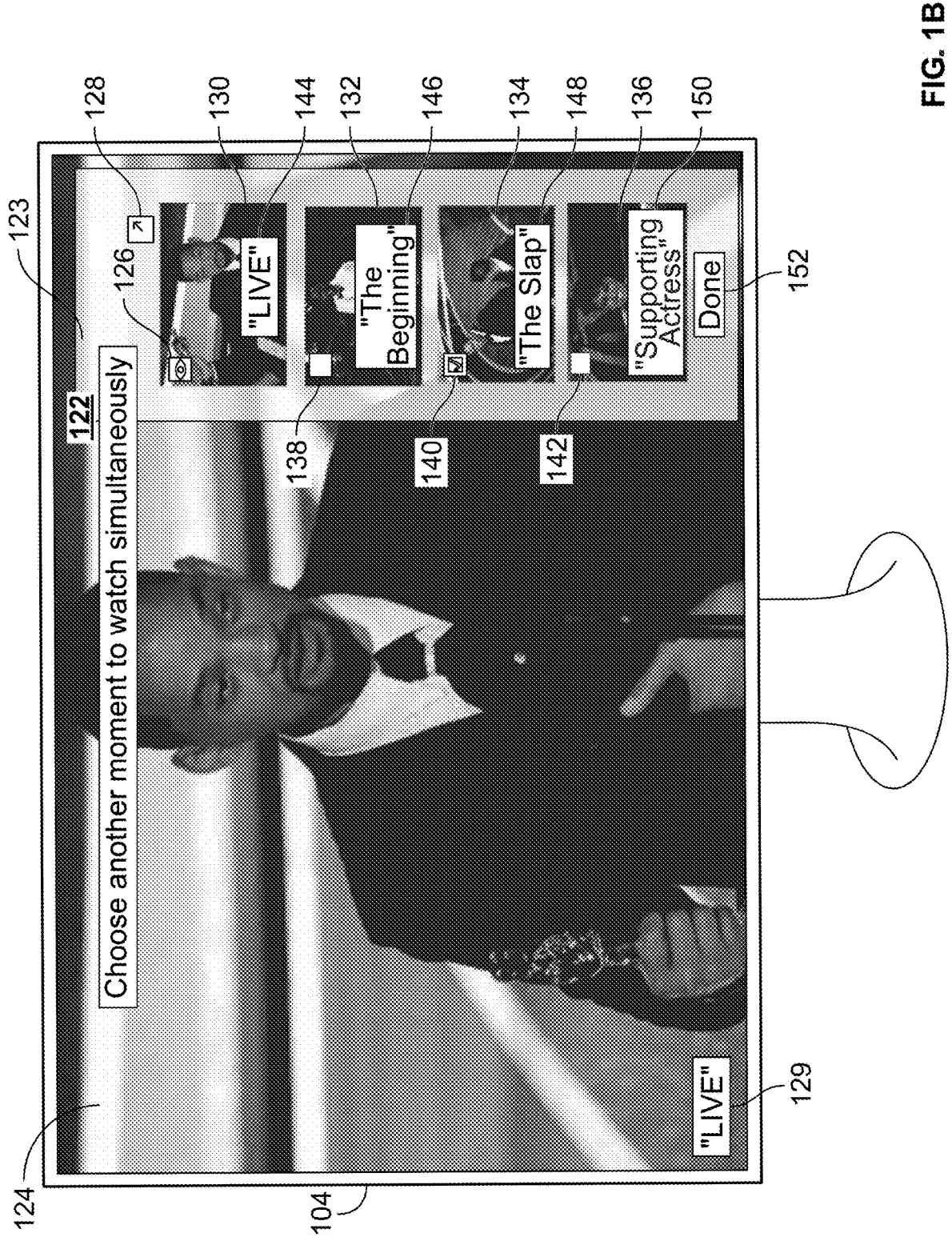
Figure 1C:
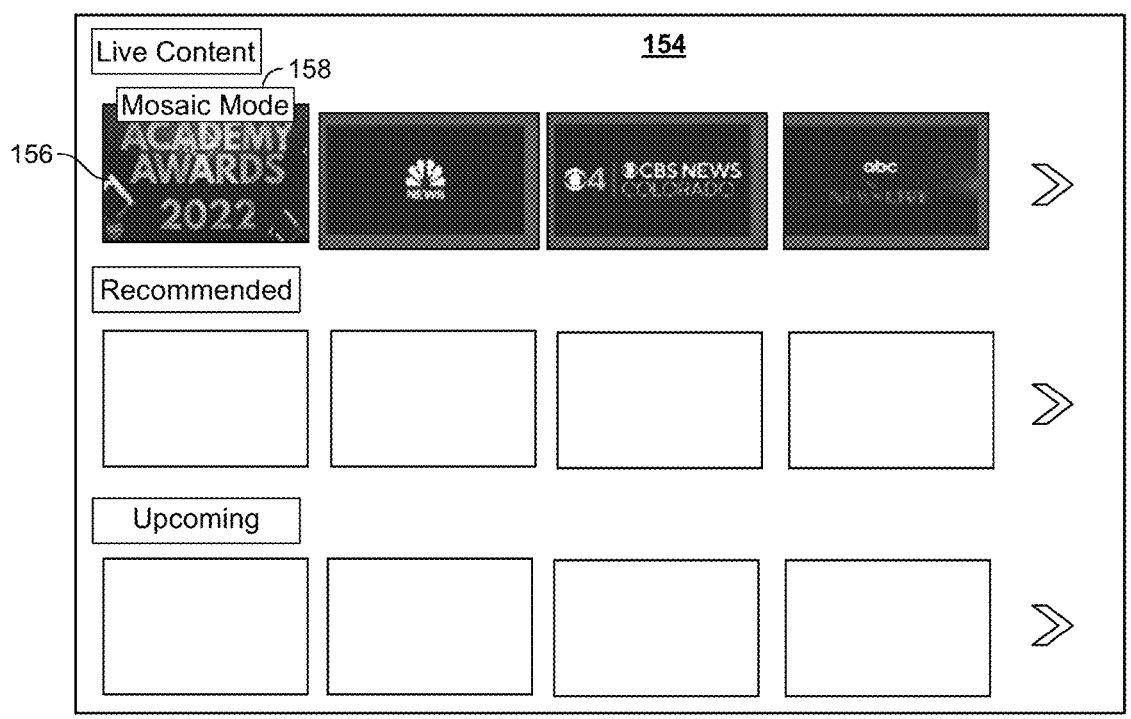

In some embodiments, one or more of the interfaces shown in FIGS. 1A-1B (and FIGS. 2A-2B) may be presented based on receiving selection of selectable icon 156 of user interface 154 of FIG. 1C. In some embodiments, selectable icon 156 of FIG. 1C may comprise or otherwise be associated with a visual indication (e.g., indicator 158) that media asset 103 is available to watch in a time-shifted multi-view (or "mosaic") mode, to enable simultaneous display of a first portion of media asset 103 (e.g., a live portion) and one or more other portions of media asset 103 (e.g., a beginning of media asset 103 and/or other suitable portion thereof). For example, the media application may cause user interface 154 to display icon 156 that is selectable to view media asset 103 (e.g., "Academy Awards 2022,"

along with a Mosaic Mode indicator 158 to show that the particular media asset can be viewed in a time-shifted multi-view mode.

Figure 6:
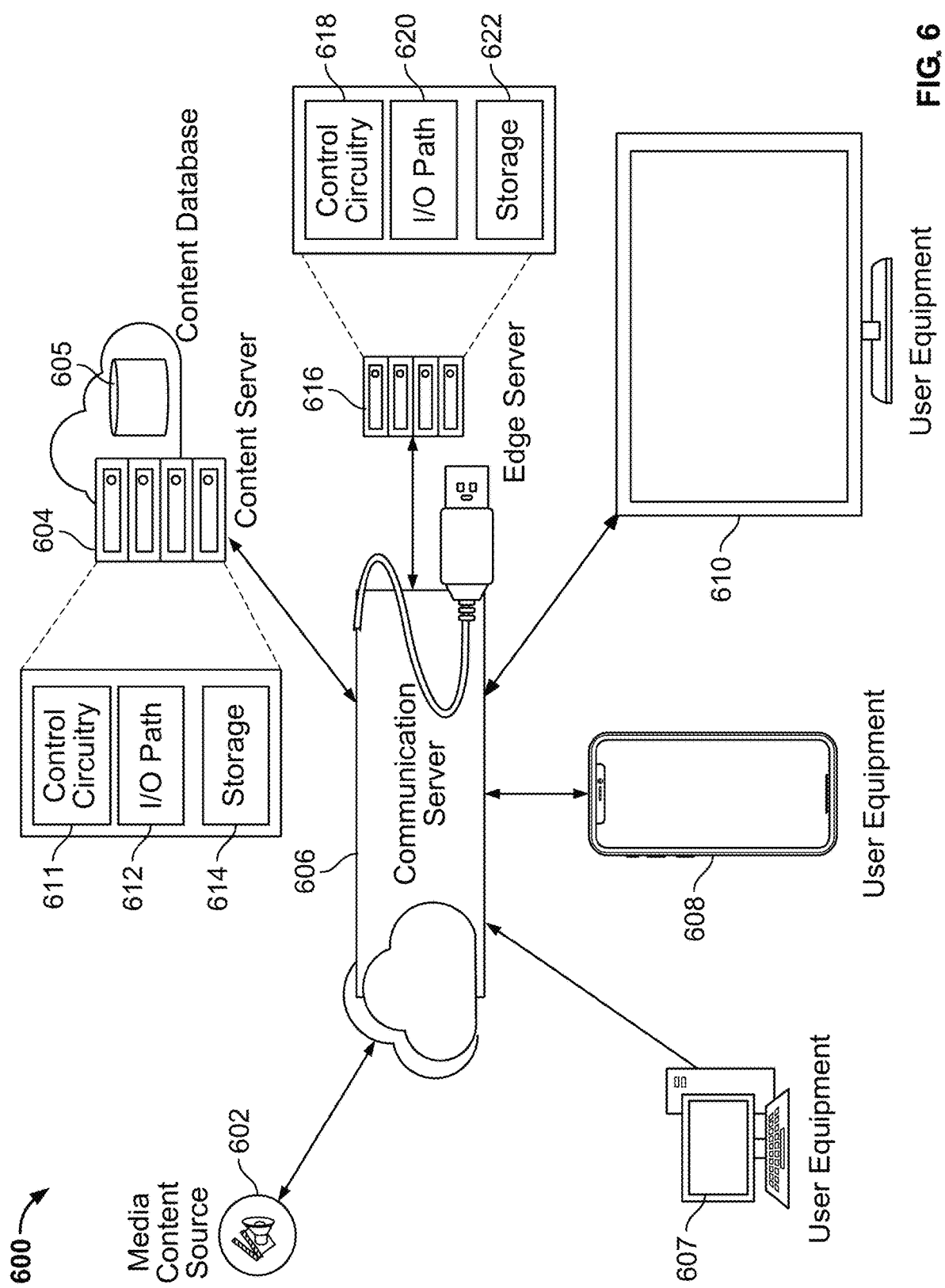

In the example of FIG. 1A, media asset 103 may correspond to a live event, e.g., a live broadcast and/or live media stream of "The Academy Awards 2022" received by computing device 104 from a content source (e.g., media content source 602 of FIG. 6 and/or content server 604 of FIG. 6 and/or any other suitable source). It should be appreciated that the present disclosure is applicable to any suitable live event, e.g., a professional or collegiate or other level of a sporting event, such as, for example, a football game, a baseball game, a hockey game, a soccer match, a tennis match, a golf tournament, a horse race, a vehicle race, or the Olympics, or any other suitable sporting event, or any combination thereof; a concert; an awards show; a play or theater or drama performance; a political debate or rally; a video game tournament; any other suitable event at any suitable venue; or any combination thereof.

As shown in FIG. 1A, the media application may cause display, at computing device 104, of user interface 100 comprising content summary section 102 and portion selection interface 101, e.g., based on a selection of selectable icon 156 on user interface 154 of FIG. 1C. In some embodiments, media asset 103 may not be displayed until user input (e.g., selection of one or more selectable icons 105, 106, 107, and/or 108, and/or indicators 109, 110, 111, and/or 112 and/or option 121) is received at user interface 100. In some embodiments, the media application may cause user interface 100 to be simultaneously displayed while media asset 103 is playing, e.g., user interface 100 may be provided as an overlay over media asset 103 or as part of a split screen which also includes media asset 103 being played. In some embodiments, each of the portions of media asset 103 corresponding to icon 106, 107, and 108, respectively, may correspond to timepoints occurring earlier in media asset 103 than a first timepoint (e.g., a live portion indicated at 113 of FIG. 1A).

In some embodiments, the portions of media asset 103 respectively corresponding to selectable icons 105, 106, 107, 108 are ranked based on when the portions associated with each selectable icon occur in the media asset, an importance ranking associated with the respective portions, user preferences, or any other suitable ranking technique, or any combination thereof. In some embodiments, such ranking may be used to determine a position of a particular selectable icon within portion selection interface 101 and/or whether a particular selectable icon should be included in portion selection interface 101 at all. In some embodiments, each selectable icon (e.g., selectable icon 105, 106, 107, 108) may include a portion title (e.g., titles 113, 114, 115, 116) to indicate the contents or other noteworthy events occurring during the corresponding portion of media asset 103. In some embodiments, selectable icons 105, 106, 107, 108 may comprise one or more respective images or video frames from the portion that the selectable icon corresponds to or represents. In some embodiments, the selectable icon associated with a portion may be a GIF or short clip of the portion, a still or static image, text, a thumbnail, any suitable representation of the portion of media asset 103, or any combination thereof. In some embodiments, selectable icons 105, 106, 107, 108 may comprise a mosaic of video players that auto-play content or snippets or previews of portion(s) of content associated with the selectable icon.

In some embodiments, when media asset 103 is selected for viewing from selection interface 154 of FIG. 1C, the media application may provide user interface 100 to enable the user to select from one or more time-shifted versions of portions of media asset 103, to cause simultaneous display of multiple portions of media asset 103. In some embodiments, a live portion (or other portion) of media asset 103 may be playing under user interface 100 or at selectable icon 106 (or other selectable icon) of user interface 100. In some embodiments, a single option such as "Join in Mosaic Mode" can be presented for selection (e.g., on user interface 154 of FIG. 1C and/or user interface 100 of FIG. 1A), which allows the concurrent display of a stream of a first portion of media asset 103 (e.g., a live portion of the live event such as shown at 106 of FIG. 1A) and one or more streams associated with the most recent event(s) or most important event(s). For example, selection of one or more of selectable icon 106 to watch from a timepoint corresponding to the beginning of media asset 103; selectable icon 107 to watch a video onwards from a timepoint corresponding to "The Slap"; or selectable icon 108 to watch a video onwards from a timepoint corresponding to "Supporting Actress" that occurred within the same media asset 103, enables multiple views (of the same or different sizes or other configurable layout or arrangement) of the selected portions to be provided to the user. In some embodiments, the media application may be configured to automatically select which portions of media asset 103 to display based on user preferences (e.g., watch history, reply history, explicit or implicit preferences, or any other suitable data, or any combination thereof).

In some embodiments, each selectable icon (e.g., selectable icons 105, 106, 107, 108) of portion selection interface 101 may comprise a corresponding selection indicator (e.g., selection indicators 109, 110, 111, 112), which indicates whether the portion corresponding to a selectable icon has been selected for display. Selection of one or more of the selectable icons may be received using any suitable input (e.g., via a remote control, a mouse, a touch screen, via voice input, biometric input, or any other suitable input, or any combination thereof). The media application may, upon receiving selection of a portion for display, provide a visual or other indicator, e.g., a checkmark, cross, any other suitable marker, or any combination thereof at the appropriate selection indicator 109, 110, 111, 112. In some embodiments, selectable icons 105, 106, 107, 108 may themselves be selectable and/or selection indicators. Portion selection interface 101 may include selection confirmation icon 121 to confirm the selections of portions of the media asset that are to be simultaneously displayed. In some embodiments, portion selection interface 101 may or may not include selection confirmation icon 121, and may determine the selections (e.g., 109, 111) of the portions based on a threshold amount of time having elapsed since the selection is received, or based on the media application receiving a threshold amount of selections, or based on the media application receiving a voice confirmation or other suitable input, or based on any other suitable criteria, or any combination thereof. In some embodiments, the media application may permit the user to select only a single view from user interface 100 (e.g., for display with the live portion of media asset 103).

The user interfaces of FIGS. 1A-1C and 2A-2B may enable a media application to efficiently provide a plurality of viewing options for various portions of a live event, e.g., upon the media application receiving a request to view the media asset. For example, a user may select for consumption media asset 103 associated with the "Academy Awards 2022" after the event has already begun. The computing device may present user interface 100 of FIG. 1A, to enable the user to select a variety of key moments such as "The Slap" or the "LIVE" portion of the event. FIG. 1A therefore may provide a straightforward and efficient interface for enabling a user to select for consumption important moments he or she desires to catch up on, while also causing display (or providing the option to display) the live portion indicated at 113, in order to stay up to date with the real-time portion of the event.

FIG. 1B shows an illustrative user interface for receiving a request to cause simultaneous display of portions of a media asset, in accordance with some embodiments of this disclosure. As shown in FIG. 1B, the media application may cause computing device 104 to display user interface 122, to enable a user to add a time-shifted video to live viewing by activating mosaic mode. For example, user interface 122 may be provided based on receiving a user selection of icon 156 of FIG. 1C, or based on receiving selection of a live portion indicated at 113 of FIG. 1A, e.g., while watching an initially selected single view of media asset 103. For example, user interface 122 may be provided by the media application to enable the user to keep adding (or deleting) windows from the mosaic mode experience associated with media asset 103.

In some embodiments, to display user interface 122, the media application may initially generate for display at least one portion of the media asset (e.g., at portion window 124), and subsequently generate for display portion selection interface 123 based on receiving selection from the user, e.g., via a remote control or via any other suitable input, e.g., while the live portion of media asset 103 is playing at portion window 124. For example, user interface 122 may be configured to, based on such user input (or automatically when the live portion of media asset 103 is playing at portion window 124), simultaneously cause presentation of portion selection interface 123 and one or more portions of the media asset 103.

Portion selection interface 123 may comprise display-status icon 126; selectable icons 130, 132, 134, 136; selection indicators 138, 140, 142; expansion icon 128; portion titles 144, 146, 148, 150 and selection confirmation icon 152. While the example of FIG. 1B shows portion selection interface 123 as overlying a right-hand portion of the presentation of portion window 124 at user interface 122, it should be appreciated that portion selection interface 123 may be provided at any other suitable portion of user interface 122 (or at a separate device, such as for example a mobile device of the user associated with user profile 125) in any suitable size or shape or manner. In some embodiments, portion selection interface 123 may include expansion icon 128 that can expand the size of portion selection interface 123. In some embodiments, if the media application receives an input selecting expansion icon 128, the media application may cause portion selection interface 123 to increase in size on user interface 122 or may redirect the user to user interface 100 of FIG. 1A. If the user is redirected from user interface 122 to user interface 100, audio and/or video of the media asset portion displayed in portion window 124 may continue to be played while user interface 100 may be an overlay over the video. In some embodiments, audio and/or video of the portions of media asset associated with selectable icons 130, 132, 134, 136 (which may correspond to selectable icons 105, 106, 107, and 108, respectively) may be provided even prior to receiving user selection thereof, or based on receiving such user selection.

As shown in FIG. 1B, user interface 122 may further comprise portion selection interface 123, portion window 124 and displayed portion title 129 corresponding to the portion of media asset 103 (e.g., the live portion) being played at portion window 124. For each of selectable icon 132, 134, 136, user interface 122 may comprise a corresponding selection indicator (e.g., selection indicators 138, 140, 142 respectively), which indicates whether the portion associated with the selectable icon has been selected for display. When a portion has been selected for display, the corresponding selection indicator changes to show, e.g., a checkmark, cross, or any other suitable marker, or any combination thereof. It should be appreciated that selectable icons 130, 132, 134, 136 may themselves be selection indicators. In some embodiments, portion selection interface 123 may further comprise indications of timepoints (e.g., timepoints 117, 118, 119, 120 of FIG. 1A) corresponding to respective the locations of portions within a duration of media asset 103. In some embodiments, portion selection interface 123 may include a selection confirmation icon 152 to confirm the selections of portions of the media asset that are to be simultaneously displayed at computing device 104, or confirmation icon 152 may not be provided and such portion(s) may be displayed upon receiving selection of icon 130-136 or indicator 136-142. In some embodiments, portion selection interface 101 may or may not include selection confirmation icon 152, and may determine the selections (e.g., 140) of the portions based on a threshold amount of time having elapsed since the selection is received, or based on the media application receiving a threshold amount of selections, or based on the media application receiving a voice confirmation or other suitable input, or based on any other suitable criteria, or any combination thereof.

As shown in FIG. 1B, user interface 122 simultaneously presents a portion of the media asset at portion window 124 and portion selection interface 123 comprising selection indicators 138, 140, 142 corresponding to selectable icons 132, 134, 136. User interface 122 may comprise displayed portion title 129 with the displayed portion to indicate which portion is currently being displayed. In some embodiments, the portion provided for display on the user interface 122 may simultaneously have a selection indicator and a corresponding icon 126 in the portion selection interface 123. The user interface may display icon 126 to indicate that the portion associated with a respective selectable icon is already being displayed at portion window 124. In some embodiments, the display-status icon acts as an indicator for whether the respective portion has been selected for simultaneous display with the other selected portions.

FIG. 2A shows an illustrative user interface 200 for causing simultaneous display of portions of a media asset, in accordance with some embodiments of this disclosure. As shown in FIG. 2A, the media application may cause computing device 104 to display user interface 200 comprising video of a plurality of portions of media asset 203 (which may correspond to media asset 103 of FIG. 1A). In some embodiments, the media application causes display of user interface 200 in response receiving one or more of a user input selecting icon 121 of FIG. 1A or selection confirmation icon 152 of FIG. 1B, a voice confirmation, a threshold amount of user selections at user interface 100 or user interface 122, or any other based on any other suitable criterion, or any combination thereof. In some embodiments, the media application displays user interface 200 after a threshold amount of time has elapsed since selections were received via user interface 100 of FIG. 1A or user interface 122 of FIG. 1B. In some embodiments, user interface 200 may be provided for display in response to the media application receiving a request to access a media asset having the "mosaic mode" capability, e.g., without receiving explicit selection of particular portions of media asset 203.

In some embodiments, if the media application causes display of user interface 200 without receiving user selections of portions, the media application may automatically (e.g., without receiving explicit user input) select one or more portions (e.g., key moments of media asset 203) for display based on when the portions occur in the media asset, an importance ranking associated with each respective portion, user preferences or any other suitable criteria, or any combination thereof. In some embodiments, the media application may cause simultaneous display of portion selection interface 123 of FIG. 1B as an overlay, picture-in-picture (PiP), or any other suitable interface configuration, in conjunction with user interface 200. FIG. 2A shows a quad-view configuration of portion windows depicting four portions of the media asset simultaneously; however, it should be appreciated that the media application may display any suitable configuration of (and/or number of) portion windows based on the portions selected at user interface 100 and/or user interface 122 (and/or based on any portions automatically selected by the media application). In some embodiments, any suitable configuration of two or more portion windows of media asset 103 may herein be referred to as "mosaic mode." In some embodiments, the layout of displayed portion windows 202, 204, 206, 208 may depend at least in part on the number of selected views.

As shown in FIG. 2A, portion windows 202, 204, 206, 208 shown in mosaic mode may comprise or be associated with corresponding close icons 210, 212, 214, 216, respectively; audio toggles 218, 220, 222, 224, respectively; and portion titles 226, 228, 230, 232, respectively. In some embodiments, if the media application receives a selection of close icon 210, 212, 214, or 216, the media application may cease displaying the corresponding portion at its associated portion window, e.g., without receiving deselection of selectable icons 105, 106, 107, 108 of FIG. 1A or selectable icons 130, 132, 134, 136 of FIG. 1B corresponding to the respective portion from user interface 100 or user interface 122. In some embodiments, after ceasing to display a particular window having been depicting a portion having of media asset 203, the media application may display a new or updated configuration of portion windows that is optimized for viewing the remaining displayed portions.

As an illustrative example, in response to the media application receiving inputs to cease display of portions of media asset 203 having been displayed in, for example, portion windows 222 and 224 (or the media application determining that the portions being displayed in such windows has concluded or have caught up to a timepoint or timestamp already shown to the user in another of the portions of user interface 200), the media application may remove such portions from user interface 200. In some embodiments, the media application may automatically reconfigure the remaining portion windows into a dual-view configuration or any other suitable configuration, based on a number of remaining portions and/or user preferences or historical configurations the user has requested.

In some embodiments, user selection of one or more of audio toggles 218, 220, 222, 224 may cause the media application to toggle on or off audio for the corresponding portion of media asset 203 being displayed, to provide the user with control over which displayed portion's audio he or she desires to listen to. In some embodiments, the media application may automatically toggle the audio on for an important moment (e.g., when "The Slap" occurs) or when the current audio is associated with a portion that is not likely to be of interest to the user (e.g., a commercial or advertisement). Alternatively, switching audio off of a window showing a commercial (and/or closing a portion of content during a commercial) may be restricted or prohibited.

In some embodiments, the media application may receive a user input requesting to activate one or more of audio toggles 218, 220, 222, 224, and based on such input, may cause display of highlight 205 (e.g., a highlight or any other suitable graphic or indicia to accentuate or emphasize the portion associated with the currently playing audio) in association with portion window 202 of the displayed portion corresponding to activated audio toggle 218. In some embodiments, audio of the portion most recently added to user interface 200, or the portion determined most likely to interest the user, may be selected by default. For example, highlight 205 and/or activated audio toggle 218 may indicate that the audio for the respective displayed portion is turned on. In some embodiments, a user may navigate or scroll to any of the displayed portions using a device such a remote control, and this may automatically trigger the audio of that portion. In some embodiments, in response to receiving a user input corresponding to deactivating audio toggle 218, 220, 222, or 224, the media application may cease display of highlight 205 around the corresponding window, to indicate that the audio for the respective displayed portion is turned off. It should be appreciated that the aforementioned embodiments for toggling on/off audio, may apply to one or more displayed portions simultaneously, therefore also enabling simultaneous output of two or more audios, and that such audio toggles may be employed in any of the user interfaces disclosed herein. In some embodiments, subtitles or closed captions may be automatically displayed for portions having their audio turned off.

FIG. 2B shows an illustrative user interface 250 for simultaneously displaying portions of a media asset, in accordance with some embodiments of this disclosure. The media application may cause computing device 104 to display user interface 250 in response receiving a user input corresponding to selection confirmation icon 121 of FIG. 1A or selection confirmation icon 152 of FIG. 1B, a voice confirmation, a threshold amount of user selections at user interface 100 or user interface 200, or based on any other suitable criterion or input, or any combination thereof. In some embodiments, the media application may cause display of user interface 250 after generating for display user interface 100 of FIG. 1A or user interface 122 of FIG. 1B for a threshold amount of time. In some embodiments, the media application automatically displays user interface 250 after receiving a selection for a media asset without receiving user selections for which portions to display. If the media application automatically displays user interface 250 without receiving user selections of portions, the media application may automatically select portions (e.g., key moments) for display based on when the portions occur in the media asset, an importance ranking associated with each respective portion, user preferences or any other suitable criterion, or any combination thereof.

As shown in FIG. 2B, portion windows 252, 254 shown in mosaic mode may comprise corresponding close icons 256, 258; audio toggles 260, 262; and portion titles 264, 266. Close icons 256 and 258 may be implemented in a similar manner as close icons 210, 212, 214, and 216, and audio toggles 260 and 262 may be implemented in a similar manner as audio toggles 218, 220, 222, and 224. In some embodiments, the media application may cause user interface 250 to comprise media playback controls (e.g., rewind 270, pause/play 272, fast-forward 274, or any other suitable media playback control, or any combination thereof), and indicator 276 of which portion's audio is being played, configuration selector icon 278, portion selector icon 280 audio toggle 282, close icon 284, or any other suitable media control icon, or any combination thereof. As an illustrative example, FIG. 2B shows the media control interface 268 as a control bar; however, it should be appreciated that the media application may display media control interface 268 as any suitable media control interface.

In some embodiments, the controls and icons of media control interface 268 correspond to controlling the displayed portion, which may be indicated by highlight 255 associated with its corresponding portion window. In some embodiments, a portion window may be highlighted based on a user input received by the media application using an input device such as a remote control, that lets the user navigate/scroll to any of the portion windows. In some embodiments, the media application may automatically highlight the portion window based on an importance ranking associated with the corresponding displayed portion. A user may use media playback controls 270, 272, and/or 274 to navigate through the highlighted displayed portion. In some embodiments, the media control interface 268 may comprise portion title 276 corresponding to a displayed portion to indicate to the user what displayed portion he or she is permitted to interact with. In some embodiments, in response to the media application receiving an input associated with configuration selector icon 278, the media application may display options (e.g., a choice of various layout configurations) for the user selection to modify a configuration of portion windows. As an illustrative example, when a user selects configuration selector icon 278 while the media application displays a horizontal dual-view configuration (e.g., as shown in user interface 250 of FIG. 2B), the media application may display options to reconfigure the portion windows into a PiP configuration, vertical dual-view configuration, or any other suitable display configuration.

As shown in FIG. 2B, media control interface 268 may comprise portion selector icon 280, to allow a user to reselect which portions to display, e.g., selection of icon 280 may cause display of user interface 100 of FIG. 1A, or user interface 122 of FIG. 1B. Media control interface 268 may comprise close icon 284. In some embodiments, close icon 284 corresponds to the same media application functions as close icons 256 and 258, e.g., if the media application receives a user input corresponding to close icon 284, the media application may close the corresponding displayed portion. It should be appreciated that the media application may display media control interface 268 on any other suitable interfaces (e.g., on user interface 200 of FIG. 2A). In some embodiments, the media application may enable a user to request to perform actions on particular displayed portion(s) that he or she may normally perform on any other media asset (e.g., record the media asset from that point until the end or up until the start point of the next chronological displayed portion), share a link or metadata about the portion (e.g., post to Instagram), or any other suitable actions.

In some embodiments, the media application may present many key moments for selection to be simultaneously displayed or may present only a select number of key moments to begin viewing from, e.g., the most recent 2 or 3, or the highest 2 or 3 based on an importance ranking. The importance ranking and/or other metadata (e.g., where to begin a timepoint) for portions of the media asset may be derived or generated using a video summarization or scene-understanding technology, computer vision, automatic video description generation and video captioning techniques, or any other suitable computer-implemented technique, or any combination thereof, to identify important portion of the media asset and/or portions likely to be of interest to the user associated with user profile 125. Video summarization is discussed in more detail in application Ser. No. 18/093,575 filed in the name of Rovi Guides, Inc., filed Jan. 5, 2023, the contents of which are hereby incorporated by reference herein in their entirety. In some embodiments, the importance ranking may be generated at least in part based on a popularity of the media asset and/or the media application monitoring social media that is being used to post (e.g., a video of "The Slap" indicated at 114 of FIG. 1A), comment, tweet, or otherwise react to the live event (e.g., media asset 103 of FIG. 1A), and the media application may derive importance rankings of one or more portions of media asset 203 based on the number of views or reactions to such post, comment, tweet or reaction or other suitable data point, or any combination thereof.

In some embodiments, the media application may select the key moments for the multi-viewing mode rather than the user, and the media application may provide the user with an option to "Join in Multi-view Mode" or "Join in Mosaic Mode." Upon selecting this option, the media application may cause the user to be automatically taken into the time-shifted multi-viewing mode in an electronic programming guide (EPG) based on key moments chosen by the system, e.g., based on trending or popular moments in media asset 203. In some embodiments, timepoints may be presented in the user interface for selecting key moments, and in multi-viewing mode, to enable the user to better develop a sense of what has occurred in media asset 203.

Figure 3:
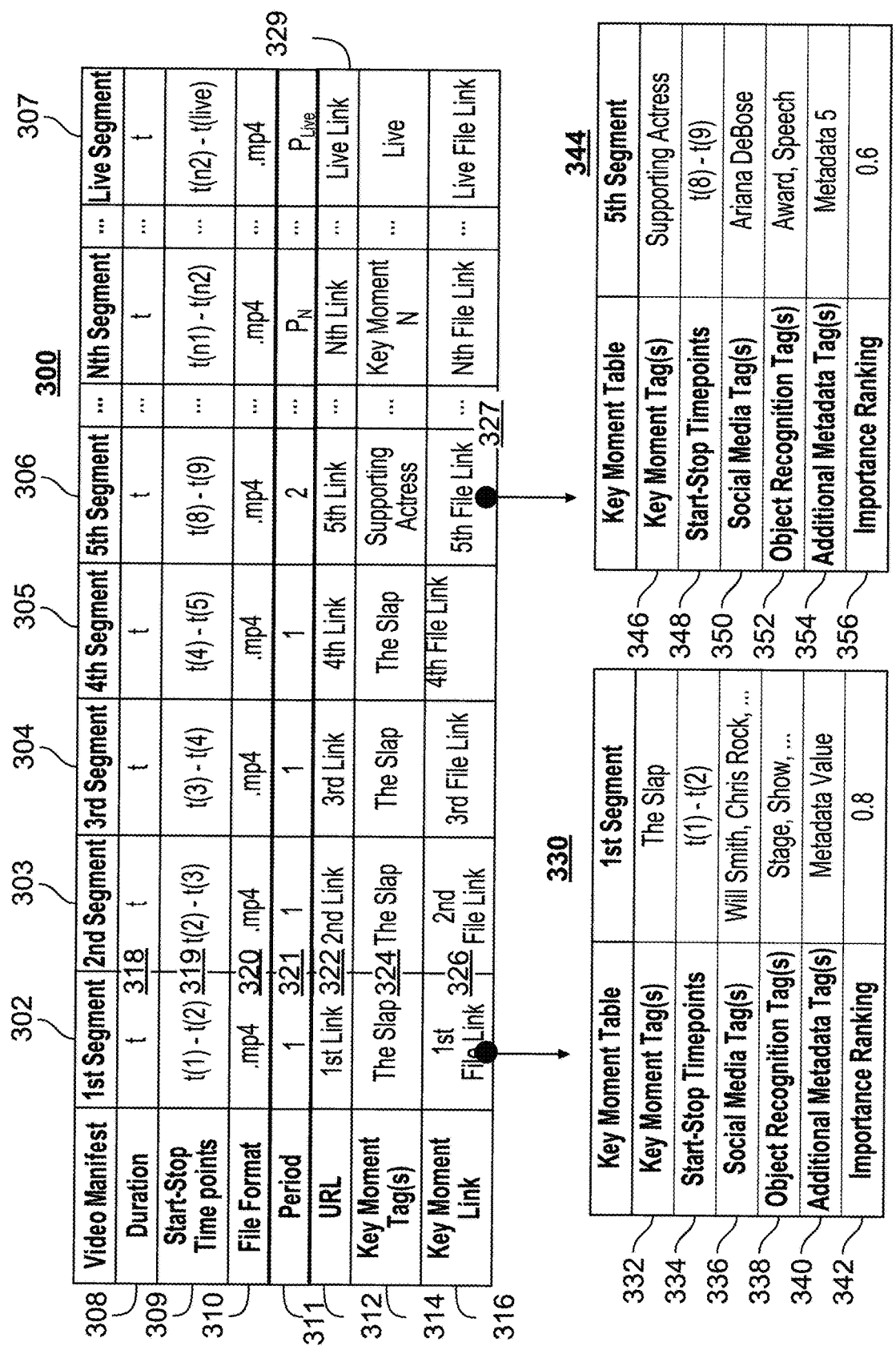
FIG. 3 shows an illustrative manifest file, in accordance with some embodiments of this disclosure.

FIG. 3 shows an illustrative manifest file 300, in accordance with some embodiments of this disclosure. As referred to herein, the term "manifest" should be understood to refer to a file and/or a data structure containing information about sequential segments (comprising sequential frames) of a media asset that is available to a client device (e.g., computing device 104 of FIG. 1A). Such information may include, e.g., a number of segments in a playlist, bit rates of each segment, codecs associated with each segment, resolution of each segment, parental rating associated with each segment, timing of each segment, location on the network (e.g., network 606 of FIG. 6) where a segment may be retrieved, bandwidth of each segment, video tracks of each segment, audio tracks of each segment, subtitle tracks of each segment, captions of each segment, languages of each segment, metadata associated with each segment, or any other suitable data, or any combination thereof.

The manifest may be employed in any of a variety of streaming protocols, e.g., media presentation description (MPD) files for Dynamic Adaptive Streaming over HTTP (MPEG-DASH), m3u8 files for HTTP Live Streaming (HLS), f4m files for HTTP Dynamic Streaming (HDS), ingest files for CMAF (Common Media Application Format), manifest files for Microsoft Smooth Streaming (MSS), any other suitable protocol, or any combination thereof. The manifest may be a standard manifest (e.g., an MPD file from MPEG-DASH) or may be a modified version of a standard manifest. A segment may comprise information (e.g., encoded video, audio, subtitle information, error correction bits, error detection bits, any other suitable data, or any combination thereof) for a particular interval of a media asset, and each segment may correspond to a file specified in the manifest indicating an associated URL for retrieving the file. The segment may comprise a collection or sequence of frames (e.g., still images that together make up moving pictures of scenes of a portion of a media asset), and each segment may have a specific length (e.g., from zero to a few seconds). In the segment-based delivery of media content using the above-mentioned streaming protocols, various techniques may be employed (e.g., MPEG-2 transport stream format, MPEG-4 format such as the fragmented MPEG-4 format).

In some embodiments, manifest file 300 for a media asset (e.g., media asset 103 of FIGS. 1A-1C or media asset 203 of FIGS. 2A-2B) may be stored at a server (e.g., media content source 602 of FIG. 6 and/or content server 604 of FIG. 6), and may comprise references to locations on a network where portions of the media asset may be retrieved, to make such portions available to a client device for streaming, broadcasting or using any other suitable transmission technique. In some embodiments, when a user requests the media asset for display (e.g., via a client device), the content server transmits manifest file 300 to the client device (e.g., computing device 104 of FIGS. 1A-1B), and manifest file 300 may enable the media application (e.g., executing at computing device 104 of FIGS. 1A-1B) to use the received manifest file 300 to start making HTTP GET calls for segments (e.g., the actual content of media asset 103 of FIGS. 1A-1C). For example, using manifest file 300, the media application may request audio and video data for segments of the media asset and may reference corresponding metadata for each video segment (e.g., through embedded metadata or data structure 400). While FIG. 3 depicts metadata of manifest file 300 in a tabular form, manifest file 300 may be a text file, an XML file, a JSON file, any other suitable file, or any combination thereof.

In some embodiments, the media asset corresponds to a real-time (or near real-time) live event, in which case the media application (e.g., executing at the content server) may periodically update manifest file 300 with new segments (e.g., live segment 307 and/or other recently provided live segments) corresponding to the real-time (or near real-time) portion of the live event. In some embodiments, the media application may flag the key moments after learning about them. For example, a key moment can be identified 2 minutes after it has occurred int the media asset, and the media application may update the current manifest file to reflect that information. Alternatively, in some embodiments, the media asset corresponds to a previously transmitted event, in which case the media application (e.g., executing at the content server) may transmit the entire manifest file (or a substantial portion thereof) upon receiving a request for the media asset at the client device. In some embodiments, a request to access the media asset may be a request to view the media asset or a request to record or download the media asset.

As shown in FIG. 3, manifest file 300 may comprise indications of a sequence of content segments (e.g., first segment 302, second segment 303, third segment 304, fourth segment 305, fifth segment 306, . . . Nth segment, and live segment 307) each comprising values for content segment duration 308; start-stop (or start-end) timepoints 309; file format 310 (e.g., MP4 320 or any other suitable file format or any combination thereof); an indication 311 of a period that a particular segment is included in; URL 312 (e.g., a first network link 322 corresponding to a URL or any other suitable resource locator); key moment tags 314 (e.g., "The Slap" 324 identifying a key moment in media asset 103 corresponding to "The Academy Awards 2022"), linked key moment file 316 (e.g., first file link 326 and fifth file link 327), or any other suitable data or manifest object, or any combination thereof. When the media application receives a request to play a media asset, the media application may reference the manifest file (e.g., referencing one or more of duration, start-stop timepoints, or segment numbering) to request and display each respective segment of the media asset in the correct timing and order, e.g., as intended by the content provider. For example, each of first segment 302, second segment 303, third segment 304, fourth segment 305, fifth segment 306, . . . Nth segment, may have occurred prior to live segment 307 during the playing of media asset 103. In some embodiments, each segment can be represented in multiple bit rates/video qualities using adaptation sets, that are currently deployed in the manifest file. Thus, each segment may have multiple URL references for retrieving the frames in a plurality of video qualities. In some embodiments, a hierarchical structure such as Period ID and segment IDs associated with a period of segments, typically used in manifest files, is employed to specify a unique segment. The manifest file 300 illustrates one possible hierarchical organization of information related to retrieval and playback of the content. In some embodiments, other equivalent organizations, that enhance the manifest file to include information related to key moments, may additionally or alternatively be employed.

Figure 4:
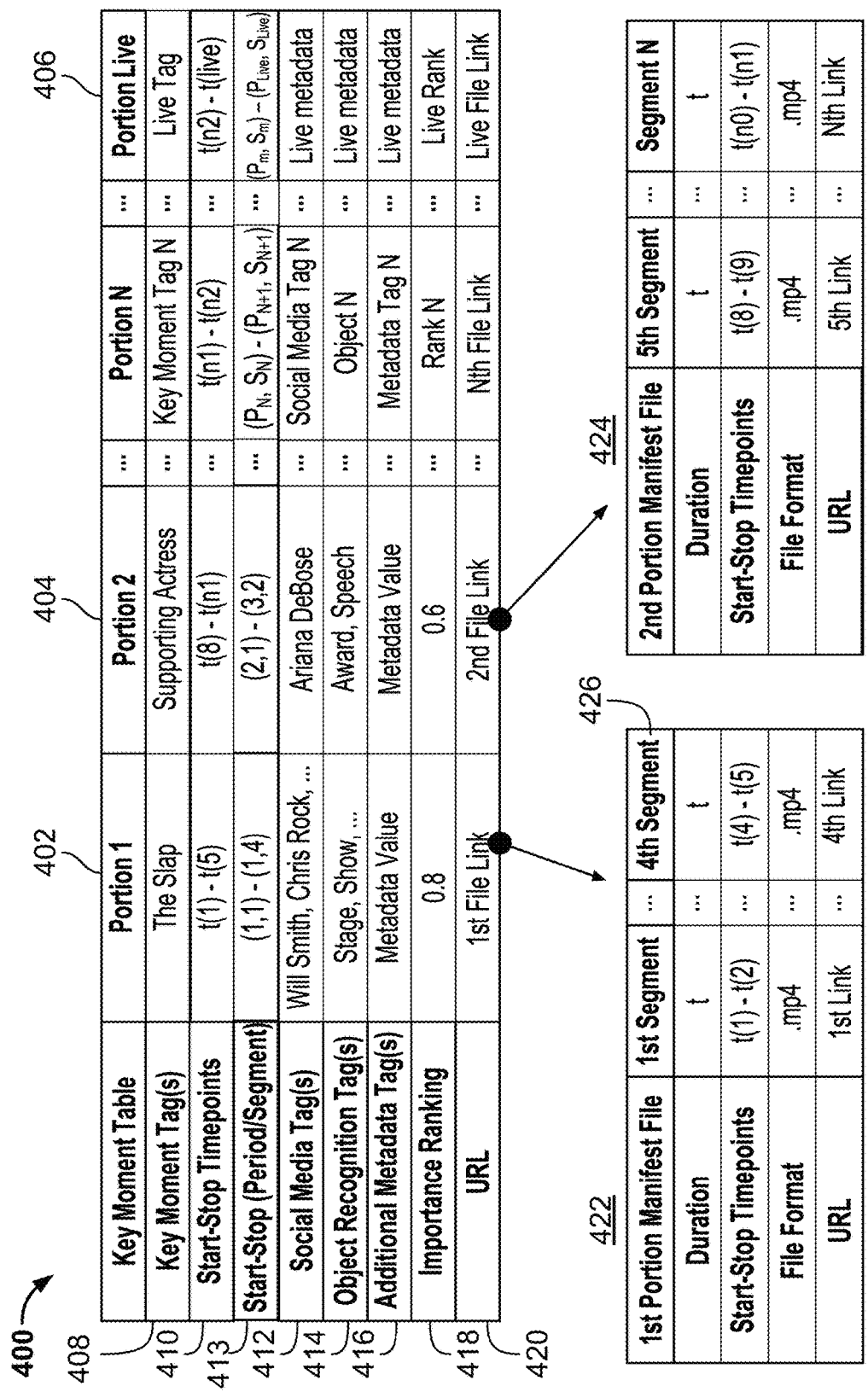
FIG. 4 shows an illustrative data structure, in accordance with some embodiments of this disclosure.

In some embodiments, each content segment 302, 303, 304, and 305 may comprise respective metadata which may be embedded directly into the manifest file (e.g., using XML, JSON, or any other suitable markup language) or included in a different file or data structure (e.g., key moments table 330, key moments table 344, and/or key moments table 400 of FIG. 4). As an illustrative example, metadata associated with a content segment included in "The Slap" 324 may be embedded metadata within manifest file 300 and as embedded metadata on key moments table 330. In some embodiments, such key moments table may be embedded in the manifest file (e.g., key moments tables 330, 344 embedded in manifest file 300) or may be a separate file and/or data structure (e.g., such as key moments table 400 of FIG. 4) that the media application may transmit separate from manifest file 300.

In some embodiments, as the live event associated with the media asset progresses, the media application (e.g., executing at the content server) may automatically update manifest file 300 with new metadata. For example, the media application may update manifest file 300 with generate or identify metadata that is generated based on analyzing audio and/or visual attributes of the media asset, and/or based on additional sources (e.g., social media or other content) associated with the media asset. In some embodiments, the media application may perform such analysis based at least in part on performing video summarization and/or scene-understanding techniques such as, for example, object recognition, facial recognition, semantic segmentation, video skimming, and/or Natural Language Processing (NLP), machine learning or artificial intelligence techniques, and/or other suitable content analysis techniques and/or any combination thereof. In some embodiments, the content server or another suitable analysis system analyzes content related to the media asset such as social media activity (e.g., posts, searches, likes, or other suitable social media data values) or information from another external source to determine generate or identify metadata for the manifest file.

In some embodiments, when the media application identifies key moments of the media asset (e.g., media asset 103 of FIG. 1A) using the analysis techniques described herein, the media application may assign a key moment tag (e.g., key moment tag 332) to segment(s) corresponding to the key moment in manifest file 300 or key moments table 330, 344 (and/or to segment(s) in a separate key moments table). In some embodiments, a single segment or portion of the media asset may be associated with multiple key moments (e.g., by being assigned more than one key moment tag). In some embodiments, an amount of, and/or the nature of, social media activity or commentary associated with a key moment or portion of the live event may influence the importance ranking (e.g., importance ranking 342) associated with the key moment. The process for identifying key moments is described in more detail in FIG. 8.

In some embodiments, the media application may, upon receiving manifest file 300 and/or data structure 330, 344 and/or 400 of FIG. 4, identify multiple segments having the same key moment tag (e.g., "The Slap" 324) as part of a same key moment. The media application may present an option to view the identified key moment portion (e.g., simultaneously with a live portion or other portions of the media asset) by displaying a respective selectable icon (e.g., selectable icons 105, 106, 107, 108 of FIG. 1A and selectable icons 130, 132, 134, 136 of FIG. 1B). When the media application receives a user selection requesting display of key moment portion(s), the media application may play segments that comprise the key moment tag corresponding to such portion in manifest file 300. The media application may play the key moment portion (and other portions that were selected) in any suitable window configuration (e.g., single-view, mosaic mode, or any other suitable configuration). As an illustrative example, if a user selects the portion of the media asset of "The Slap" (represented by selectable icon 107 of FIG. 1A) for display, the media application may cause such portion to be played starting from the start timepoint t(1) at first segment 302 up to the stop timepoint t(5) at fifth segment 305, since those respective timepoints define the interval of segments containing the key moment tag, "The Slap" 324.

The media application and/or the content server and/or another suitable system may be configured to analyze the content and external sources (e.g., social media activity) during the content processing phase or at any other suitable time. In some embodiments, the content server may update the manifest file of a stored media asset, if the content server or another suitable analysis system identifies or generates metadata associated with the media asset or the corresponding event. In some embodiments, the media application analyzes the media asset and external sources in real time (or near real time) in order to ensure a good customer experience. Real-time analysis may allow for a content server to identify key moments and indicate such key moments in the manifest file (and/or a separate key moments table) as the key moments occur, giving the user the greatest optionality in selecting times from which to start watching the media asset.

As shown in FIG. 3, the media application may transmit data comprising key moments table 330 and key moments table 344, e.g., from a remote server to computing device 104 of FIG. 1A. Key moments table 330 may comprise metadata for first segment 302, e.g., key moment tags 332 (e.g., "The Slap" which may correspond to the portion indicated at 115 of FIG. 1A); start-stop timepoints 334; social media tags 336, object recognition tags 338, additional metadata tags 340; importance ranking 342, or any other suitable data, or any combination thereof. In some embodiments, the media application may reference importance ranking 342 associated with the corresponding segment or portion of the media asset, to determine a ranking order for portion options (e.g., such as portion options shown in user interface 100 of FIG. 1A and portion selection interface 123 of FIG. 1B) or determine the configuration of displayed portions (e.g., such as displayed portions of user interface 200 of FIG. 2A and user interface 250 of FIG. 2B).

Similarly, key moments table 344 may comprise metadata for fifth segment 306 comprising a key moments tag 346 (e.g., "Supporting Actress" which may correspond to the portion indicated at 116 of FIG. 1A); start-stop timepoints 348; social media tags 350, object recognition tags 352, additional metadata tags 354; importance rankings 356, or any other suitable data, or any combination thereof.

In some embodiments, the media application may determine the importance ranking based on audiovisual attributes of the media asset (e.g., to identify objects and generate object recognition tags 338 and 353) and/or social media (e.g., to identify social media tags 336 and 353), user preferences, or any other suitable factor. In some embodiments, the key moments table may comprise a description of a portion of the media asset, a thumbnail image of a portion of the media asset, and/or any other suitable data associated with a key moment that may be presented to the user to watch a media asset in mosaic mode. In some embodiments, the media application may generate a description, title, thumbnail image and any other suitable identifiers based on the provided metadata (e.g., for the social media tags 336, object recognition tags 338, additional metadata tags 340). When a video player client of the media application requests a media asset, the content server may embed the key moments tables in manifest file 300, or it may send the key moments tables separately. In some embodiments, the content server sends a single key moments table (e.g., data structure 400 of FIG. 4) defining metadata for each segment of the media asset that has occurred or is occurring. The media application may access first file link 326 and fifth file link 327, to reference a specific part of the table corresponding to the respective segments.

FIG. 4 shows an illustrative data structure, in accordance with some embodiments of this disclosure. As discussed in connection with FIG. 3, key moments tables 330, 344 may store metadata for respective segments of the media asset. As shown in FIG. 4, data structure 400 may correspond to a key moments table storing metadata for respective portions of the media asset, where each of such portions may comprise a plurality of segments. Key moments table 400 may comprise key moment tags 408, start-stop (or start-end) timepoints 410, start-stop (period/segment) 413, social media tags 412, object recognition tags 414, additional metadata tags 416, importance ranking 418, portion manifest link 420 (linking to first manifest file 422 and second manifest file 424), any other suitable data, or any combination thereof, for each of portion 402, 404, . . . N and the live portion 406. In some embodiments, key moments table 400 may comprise a description, thumbnail image, and any other suitable identifier corresponding to a key moment that may be presented to a user as a viewing option. In some embodiments, the media application may generate a description, title, thumbnail image and any other suitable identifiers for the portion based on the provided metadata (e.g., for the social media tags 412, object recognition tags 414, additional metadata tags 416). In some embodiments, the media application orders the selectable icons of FIGS. 1A-1B and/or the portion windows of FIGS. 2A-2B based on the importance ranking 418 associated with each respective portion.

As shown at 413, if a key moment corresponding to portion 1 indicated at 402 runs from period 1, segment 1, through period 1, segment 4, this may be represented as (1,1)-(1,5). A period may correspond to a chunk of the media asset indicated in the manifest file as having a duration and a start time. Further, a key moment corresponding to portion 2 indicated at 404 may run from period 2, segment 1, though period 3, segment 2. In some embodiments, the key moments table may be used as a lookup for (period, segment) for a particular key moment. Then the manifest file (which may or may not contain key moments table) may be used to lookup the URL or other identifier for the corresponding (period, segment), and such identifier may be used to retrieve audio and/or video of such portion of the media asset.

In some embodiments, the information stored at key moments table 400 enables the media application to efficiently identify each portion corresponding to a key moment (e.g., first portion 402 corresponding to "The Slap"). For example, the media application may reference a single set of start-stop timepoints (e.g., start-stop timepoints 410 defining the interval in which portion corresponding to "The Slap" occurs) to determine a key moment portion within a media asset, instead of alternatively parsing manifest file 300 for the first segment and last segment with a respective key moment tag. In some embodiments, the content server may generate first manifest file 422 and second manifest file 424 for each respective portion, such that each portion manifest file only contains segments corresponding to a specific key moment (e.g., portion manifest file only contains segments within start-stop timepoints 410 corresponding to "The Slap"). As an illustrative example, if a user selects "The Slap" (represented by selectable icon 107 of FIG. 1A) for display, the media application determines that first portion 402 of the media asset corresponds to the selected key moment since it contains the key moment tag "The Slap." Subsequently, the media application may access the manifest file corresponding to first portion 402 and play all segments comprised in the respective manifest file.

In some embodiments, the media application may provide portions of the media asset for simultaneous display by employing the same manifest file (e.g., manifest file 300) for each of live segment 307 and segments 302, 303, 304, 305, and 306 that occurred prior to such live segment. Such usage of a single manifest file 300 may enable a lower latency experience for the user and may minimize the use of computing and/or network resources. On the other hand, the media application may provide portions of the media asset for simultaneous display by employing multiple different manifests, e.g., first manifest file 422 and second manifest file 424, which may be static manifests for key moments of media asset 103, as well as a dynamic manifest for live streaming. Such usage of multiple manifests may enable advertisement insertion opportunities, which may be dynamically determined to be related to a key moment that is being displayed or that is to be displayed.

In some embodiments, supplemental content (e.g., advertisements) provided to the user during the consumption of one or more of the time-shifted streams are prevented from being displayed again during the real-time live stream, and/or supplemental content (e.g., advertisements) to be provided for display during the live portion of the media asset may be prevented from being displayed during the time-shifted portions of the media asset occurring earlier in the runtime of the media asset. In some embodiments, utilizing different manifest files for each displayed portion may cause supplemental content markers within each respective manifest file to be unembedded, such that the media application may request new supplemental content (e.g., advertisements) individually for every displayed portion. In some embodiments, an advertisement queue or an advertisement session may be associated with a specific user and/or streaming session and/or device to facilitate the presentation of supplemental content or supplemental content pods during the presentation of the media asset. This may allow supplemental content presented for one displayed portion of the media asset to be omitted from supplemental content presented during the consumption of another displayed portion of the media asset. Maintaining an advertisement queue is discussed in more detail in U.S. Pat. No. 9,374,605 B2, issued Jun. 21, 2016, the contents of which are hereby incorporated by reference herein in their entirety.

In some embodiments, the media application may enable real-time supplemental content bidding for each selected portion, and a particular supplemental content item can be inserted based on metadata (e.g., key moment tags 408, social media tags 336, object recognition tags 338, additional metadata tags 340) associated with a portion of the media asset selected for display, on user profile data, any other suitable personalization data, any other suitable data, or any combination thereof. In some embodiments, supplemental content providers may bid on having their supplemental content (e.g., advertisements) shown (e.g., pre-roll) prior to playing one of the time-shifted streams, and/or the supplemental content may be presented at the same time the supplemental content is played when the original content was broadcasted (using existing advertisement markers). In some embodiments, national advertisements originally included in the broadcast may be presented if one or more time-shifted streams are displayed, and/or advertisement targeting can be used based on the event, key moment, user profile, and/or other factors. In some embodiments, popularity of certain portions of a media asset (e.g., "The Slap) may be provided to a supplemental content provider in real time, to enable the supplemental content provider to request or bid on its supplemental content to be inserted into such portion.

For example, upon causing display of first portion 402 corresponding to the key moment, "The Slap," the media application may embed an advertisement for the movie "King Richard" into the portion manifest file based on the metadata (e.g., for the actor "Will Smith") matching the advertisement metadata (e.g., "Will Smith" as an actor in the movie "King Richard"). In some embodiments, the media application may restrict or disable the presentation of supplemental content, and/or restrict or disable fast-forwarding or skipping functionalities in relation to such supplemental content in the displayed time-shifted streams, based on licensing parameters, or the popularity associated with the displayed time-shifted streams.

Figure 5:
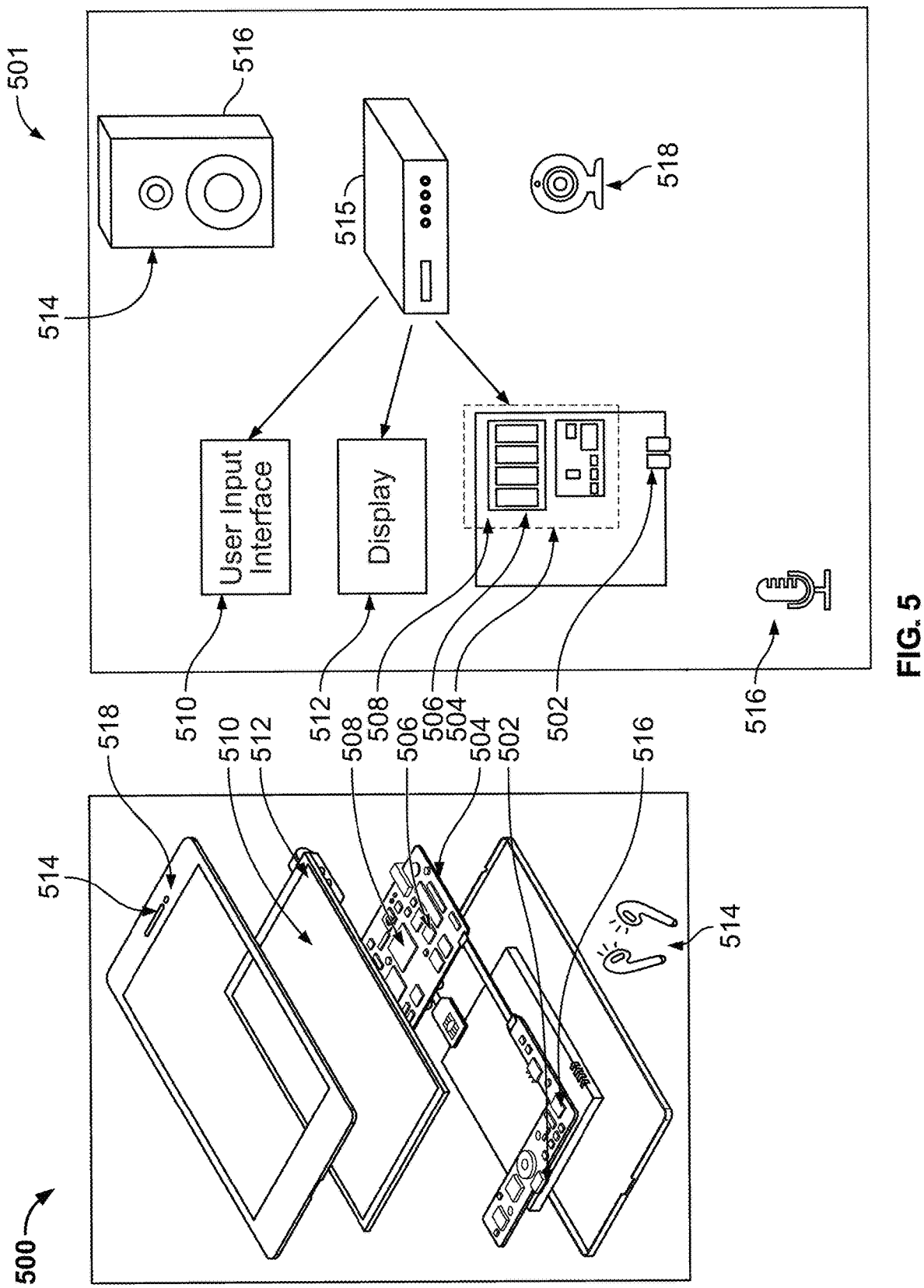
FIGS. 5-6 show illustrative devices and systems for causing simultaneous display of portions of a media asset, in accordance with some embodiments of this disclosure.

FIGS. 5-6 show illustrative devices and systems for causing simultaneous display of portions of a media asset, in accordance with some embodiments of this disclosure. FIG. 5 shows generalized embodiments of illustrative devices 500 and 501, which may correspond to, e.g., computing device 104. For example, device 500 may be a smartphone device, a tablet, a virtual reality or augmented reality device, or any other suitable device capable of accessing content items stored at a server (e.g., a content server) over a communication network (e.g., network 606). In another example, device 501 may be a user television equipment system or device. Device 501 may include set-top box 515. Set-top box 515 may be communicatively connected to microphone 516, audio output equipment (e.g., speaker or headphones 514), and display 512. In some embodiments, microphone 516 may receive audio corresponding to a voice command related to recording content items. In some embodiments, display 512 may be a television display or a computer display. In some embodiments, set-top box 515 may be communicatively connected to user input interface 510. In some embodiments, user input interface 510 may be a remote control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing devices are discussed below in connection with FIG. 6. In some embodiments, device 500 may comprise any suitable number of sensors, as well as a GPS module (e.g., in communication with one or more servers and/or cell towers and/or satellites) to ascertain a location of device 500.

Each one of device 500 and device 501 may receive content and data via input/output (I/O) path 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise or correspond to I/O circuitry 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 6 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 500), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the media application stored in memory (e.g., storage 508). Specifically, control circuitry 504 may be instructed by the media application to perform the functions discussed above and below. In some implementations, processing or actions performed by control circuitry 504 may be based on instructions received from the storage management application.

In client/server-based embodiments, control circuitry 504 may include communications circuitry suitable for communicating with a storage management server (e.g., a cloud DVR, content database) or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of device 500.

In some embodiments, the media application may be a client/server application where only the client application resides on device 500 (e.g., computing device 104), and a server application resides on an external server (e.g., content server 604 and/or edge server 616). For example, the media application may be implemented partially as a client application on control circuitry 504 of device 500 and partially on content server 604 as a server application running on control circuitry 611. Content server 604 may be a part of a local area network with one or more of device 500 or may be part of a cloud computing environment accessed via the internet. In a cloud computing environment, various types of computing services for performing searches on the internet or informational databases, providing access to content items, providing storage (e.g., for a database) or parsing data are provided by a collection of network-accessible computing and storage resources (e.g., content server 604), referred to as "the cloud." When executed by control circuitry of content server 604, the media application may instruct control circuitry 504 or control circuitry 611 to perform processing tasks for the client device and facilitate the simultaneous presentation of multiple portions of a media asset.

Control circuitry 504 may include communications circuitry suitable for communicating with a cloud DVR, media content source, edge servers and devices, a table or database server, or other networks or servers The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of computing devices, or communication of computing devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and down converting content into the preferred output format of device 500. Control circuitry 504 may also include digital-to-analog converter circuitry and analog-to-digital converter circuitry for converting between digital and analog signals. The tuning and encoding circuitry may be used by device 500, 501 to receive and to display, to play, or to record content. The tuning and encoding circuitry may also be used to receive content item data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, PIP functions, multiple-tuner recording, etc.). If storage 508 is provided as a separate device from device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of device 500 and device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and device 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The media application may be implemented using any suitable architecture. For example, it may be a stand-alone application wholly implemented on each one of device 500 and device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide storage management functionality and generate any of the displays discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 504 may allow a user to provide user profile information or may automatically compile user profile information. For example, control circuitry 504 may access and monitor network data, video data, audio data, processing data, content consumption data and user interaction data. Control circuitry 504 may obtain all or part of other user profiles that are related to a particular user (e.g., via social media networks), and/or obtain information about the user from other sources that control circuitry 504 may access. As a result, a user can be provided with a unified experience across the user's different devices.

In some embodiments, the media application is a client/server-based application. Data for use by a thick or thin client implemented on each one of device 500 and device 501 may be retrieved on-demand by issuing requests to a server remote to each one of device 500 and device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via user input interface 510 and transmit those inputs to the remote server for processing and generating the corresponding displays. For example, device 500 may transmit a communication to the remote server indicating that an up/down button was selected via user input interface 510. The remote server may process instructions in accordance with that input and generate a display of the application corresponding to the input (e.g., a display that moves a cursor up/down). The generated display is then transmitted to device 500 for presentation to the user.

In some embodiments, the media application may be downloaded and interpreted or otherwise run by an interpreter or virtual machine (run by control circuitry 504). In some embodiments, the media application may be encoded in the ETV Binary Interchange Format (EBIF), received by control circuitry 504 as part of a suitable feed, and interpreted by a user agent running on control circuitry 504. For example, the media application may be an EBIF application. In some embodiments, the media application may be defined by a series of JAVA-based files that are received and run by a local virtual machine or other suitable middleware executed by control circuitry 504. In some of such embodiments (e.g., those employing MPEG-2 or other digital media encoding schemes), media application may be, for example, encoded and transmitted in an MPEG-2 object carousel with the MPEG audio and video packets of a program.

FIG. 6 shows illustrative devices and systems for providing one or more portions of the media asset, in accordance with some embodiments of this disclosure. Computing devices 607, 608, 610 (e.g., which may correspond to computing device 104 of FIG. 1A) may be coupled to communication network 606. Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between computing devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The computing devices may also communicate with each other directly through an indirect path via communication network 606.

System 600 may comprise media content source 602, one or more content servers 604, and one or more edge servers 616. In some embodiments, the media application may be executed at one or more of control circuitry 611 of content server 604 (and/or control circuitry of computing devices 607, 608, 610 and/or control circuitry 618 of edge server 616). In some embodiments, manifest file 300 of FIG. 3, first manifest file 422 and/or and second manifest file 424 of FIG. 4, may be stored at storage 614 or content database 605 maintained at or otherwise associated with content server 604, and/or at storage 622 and/or at storage of one or more of computing devices 607, 608, 610.

In some embodiments, content server 604 may include control circuitry 611 and storage 614 (e.g., RAM, ROM, Hard Disk, Removable Disk, etc.). Storage 614 may store one or more databases. Content server 604 may also include an input/output path 612. I/O path 612 may provide content consumption data, user interaction data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise or correspond to I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge server 616 may comprise control circuitry 618, I/O path 620 and storage 622, which may be implemented in a similar manner as control circuitry 611, I/O path 612 and storage 624, respectively, of content server 604. Edge server 616 may be configured to be in communication with one or more of computing devices 607, 608, 610 and content server 604 over communication network 606, and may be configured to provide content from a pool of shared content to subscribers associated with a shared pool of copies of content items. In some embodiments, a plurality of edge servers 616 may be strategically located at various geographic locations, configured to store (e.g., cache) content items for delivery to various shared pools of copies for a plurality of cloud DVR subscribers.

Figure 7:
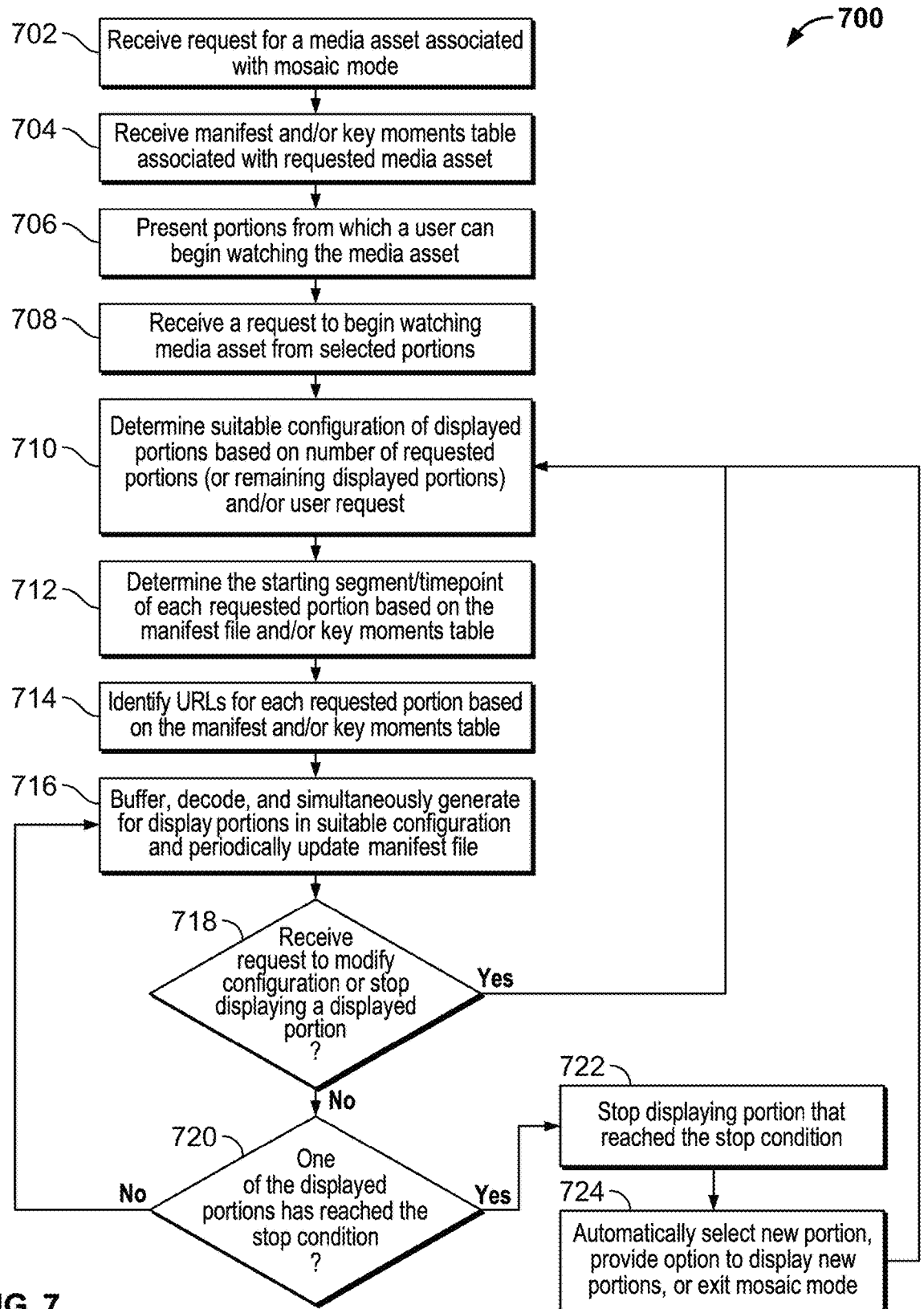
FIG. 7 is a flowchart of a detailed illustrative process for providing for simultaneous display portions of a media asset, in accordance with some embodiments of this disclosure.

FIG. 7 is a flowchart of a detailed illustrative process 700 for providing for simultaneous display portions of a media asset, in accordance with some embodiments of this disclosure. In various embodiments, the individual steps of process 700 may be implemented by one or more components of the devices, systems, and methods of FIGS. 1-6, 8 and 9. Although the present disclosure may describe certain steps of process 700 (and of other processes described herein) as being implemented by a media application residing on, e.g., certain components of the devices, systems, and methods of FIGS. 1-6, 8 and 9, this is for purposes of illustration only, and it should be understood that other components of devices and systems, e.g., as displayed in FIGS. 1-6, 8 and 9, may implement those steps instead.

At 702, the media application may receive a request for a media asset associated with mosaic mode (e.g., media asset 103 corresponding to the event, "The Academy Awards 2022" of FIG. 1A). For example, I/O circuitry 502 of computing device 500 or computing device 501 may transmit such request for the media asset to media content source 602 and/or content I/O circuitry 612 of server 604, which may be included as part of, or may be separate from, control circuitry 611 of content server 604. Such request may be transmitted over a communication network (e.g., communication network 606 of FIG. 6) from a computing device (e.g., computing device 104 of FIG. 1A) at which a user may be logged into his or her user profile (e.g., user profile 125 of FIG. 1A) to request access for the media asset. For instance, the computing device may transmit a "tune in" or "multicast join" request to receive permission to access a live stream of the media asset in the time-shifted, multi-view mode.

At 704, the media application may receive a manifest file (e.g., manifest file 300 of FIG. 3, or first manifest file 422 or second manifest file 424 of FIG. 4 and/or a dynamic live manifest for a live portion of the media asset) and/or a key moments table (e.g., key moments tables 330, 344 of FIG. 3 or data structure 400 of FIG. 4). Such data may be received, for example, by I/O circuitry of a client device (e.g., computing device 104 of FIG. 1A) from a server (e.g., content server 604 of FIG. 6). In some embodiments, the key moments table is embedded in the manifest file and received by the media application simultaneously with the manifest file. In some embodiments, the live manifest may be shared by all the player instances associated with time-shifted stream (e.g., key moments). In some embodiments, the key moments table is separate from the manifest file, and the media application may receive the key moments table separately from the media asset such that the media asset may not be sent until one or more portions of the media asset are requested, and in such circumstance, at 704, it may be sufficient to send the key moments table without sending the manifest. If the key moments table is embedded within the manifest, the manifest may be received and parsed to identify options for portions of the media asset for multi-viewing.

In some embodiments, as content is being streamed or broadcast and the media application determines that a key moment has occurred, the media application may create a section in the manifest file for such portion, and append or add such section to a live manifest file requested by the user, which may be continuously updated (e.g., every few seconds) and sent to the user as the live portion progresses.

In some embodiments, control circuitry (e.g., control circuitry 504 of device 500 of FIG. 5 and/or control circuitry 611 of content server 604 of FIG. 6) may identify multiple portions corresponding to key moments of the event based on key moment tags (e.g., key moment tags 314, 332 of FIG. 3 and key moment tags 408 of FIG. 4) integrated into the manifest file (e.g., manifest file 300 of FIG. 3 of first and second manifest files 422, 424) and/or integrated into the key moments table (e.g., key moments tables 330, 344 of FIG. 3 or key moments table 400 of FIG. 4).

In some embodiments, a "join manifest" is created for every event in the key moments table, and updated dynamically as key moments are identified. Such customized manifest may comprise data associated with portions of the media asset that correspond to a subset of the media asset, except that a first segment may reference a first portion of a key moment of the media asset (that a user chooses or that is automatically chosen for the user). For example, if the user tunes in to or accesses a live event (or other type of media asset) at the two hour mark, and chooses to join the stream in "Mosaic Mode," and the media application determines that two key events have occurred at the 50-minute mark and the 90-minute mark, respectively, then the media application fetches the live event manifest so that it is receives updates to fetch newly available segments or fragments as they become available). The shared live manifest may include the key moments table including information associated with the start of the first event (50-minute mark) and start of second event (90-minute mark). In some embodiments, each key moment in the key moments table may be associated with a start time and end time within the media asset, and segments associated with the one or more key moments may be played back to back along with the live stream.

In some embodiments, an entry in the key moments table or a field in the manifest associated with a key event has a start and an end time (e.g., specifies a portion or a subset of the overall segments specified in the manifest with a defined start and end time), such that the live event is divided into "chapters". For example, each key moment or chapter may have a separate manifest created from the live manifest. For example, the manifest associated with the 50-minute mark can reference the content from the 50-minute mark up until the 90-minute mark, while the manifest that is associated with the 90-minute mark may reference the content from the 90-minute mark up until the 120-minute mark. In some embodiments, a content provider or supplemental content provider may customize each manifest with different supplemental content (e.g., advertisement) insertion opportunities.

As another example, if a current window configuration being displayed at a user interface of a user's computing device includes a live stream and two time-shifted streams starting at 50 minutes and 90 minutes, respectively, and the user tunes or joins or accesses the live stream at the two hours or 120-minute mark, the media application may cause the video associated with the 50-minute stream to be played until the 90-minute mark, and may disappear, since the stream associated with the 90-minute mark was already being played. Similarly, the video associated with the 90-minute mark may play for only 30 minutes (e.g., until it has reached the 120-minute mark). In some embodiments, such streams can be paused and resumed as well. In some embodiments, if the media application detects that the user has left the mosaic mode interface and subsequently returns to such interface, the media application might present a different list of key events (e.g., more recent key events) and allow the user to resume one or more of the paused time-shifted streams.

At 706, the media application may provide a user interface (e.g., user interface 100 of FIG. 1A) presenting a plurality of the portions from which a user can begin watching the media asset. These portions may be, for example, key moments (e.g., important portions, the beginning of the media asset, the live portion of the media asset, any other suitable portions, or any combination thereof) determined to be available in the media asset. In some embodiments, control circuitry (e.g., of computing device 104 of FIG. 1A) may provide (e.g., for display) the portions from which the user can begin watching the media asset in an order based on an importance ranking (e.g., importance ranking 342 of FIG. 3 and/or importance ranking 418 of FIG. 4) associated with each portion. For instance, control circuitry may compare user preferences from an associated user profile with metadata (e.g., key moment tags, social media tags, object recognition tags, object recognition tags, any other suitable metadata tags, or any combination thereof) associated with the media asset to determine which portions of the media asset are likely to be of interest to the user. In some embodiments, the media application may modify importance rankings associated with each portion based on a comparison of (and determined similarity between) user preferences and metadata. In some embodiments, the control circuitry may display the portions in an order based on how likely such portions may be of interest to the user. In some embodiments, the identified portions or key moments may be displayed with thumbnails, descriptions, titles and/or other metadata associated with the portions of the media asset.

At 708, the media application may receive a request to begin watching the media asset from the selected portions (e.g., by selecting selectable icons 105, 106, 107, and/or 108 shown in user interface 100 of FIG. 1A). For example, I/O circuitry of computing device 104 and/or content server 604 may receive a request to view portions of the media asset corresponding to "LIVE" and "The Slap," as is shown by the checkmarks indicated at selectable icons 105, 107 of FIG. 1A.

At 710, after receiving the request to begin watching the media asset from selected portions, the media application may determine a suitable configuration (e.g., single view, dual-view, quad-view, PiP, or any other suitable configuration) of portion windows based on the number of selected portions, the resolution of the display (e.g., display 512 of device 500 of FIG. 5) or based on any other suitable criterion, or any combination thereof. This may allow a client with a specific layout to be instantiated for displaying the various streams, and may determine which representation is to be requested (e.g., a particular resolution) from the available representations for a particular portion of the media asset. In some embodiments, control circuitry (e.g., control circuitry 504 of device 500 of FIG. 5 and/or control circuitry 611 of content server 604 of FIG. 6) may perform the determining of a suitable configuration of the portion windows. For instance, after receiving a request to view portions of the media asset corresponding to "LIVE" and "The Slap," control circuitry of computing device 104 may determine that the selected portion should be presented in a dual-view configuration based on receiving a request for two media asset portions (e.g., as is shown by user interface 200 of FIG. 2B). In some embodiments, the position of each portion window in the configuration is assigned based on the importance ranking (e.g., importance ranking 342 of FIG. 3 and/or importance ranking 418 of FIG. 4) assigned to each respective displayed portion. In some embodiments, depending on whether the different views of the simultaneously displayed portions are of the same size on the display, or different sizes, the requested representations of different views may be similar or dissimilar.

At 712, the media application may determine the starting segments and/or starting timepoint of each selected portion based on the manifest file and/or key moments table. In some embodiments, control circuitry (e.g., control circuitry 504 of device 500 of FIG. 5 and/or control circuitry 611 of content server 604 of FIG. 6) identifies the start timepoint and/or start segment for a portion by parsing the manifest file for segments containing the key moment tag associated with the portion. For instance, if the control circuitry receives an indication of a request to display portions corresponding to the key moment tag "LIVE" and "The Slap," (refering back to FIG. 1A-B) control circuitry parses manifest file 300 for segments containing the key moment tag "LIVE" and "The Slap." Based on such parsing, the control circuitry may determine that the portion corresponding to "The Slap" starts at first segment 302 (or timepoint t(1)) and the portion corresponding to "LIVE" starts at live segment 307 (or timepoint t(live), as shown in FIG. 3. In some embodiments, the control circuitry identifies the start timepoint and/or start segment for a portion by referencing a key moments table (e.g., key moments table 400) and identifies the key moment tag corresponding to the selected portion. In some embodiments, the control circuitry may, while parsing key moments table 400, simultaneously determine the end point of a particular portion and retrieve a manifest file for a particular portion (e.g., first manifest file 422 and second manifest file 424 of FIG. 4) that may contain only the segments for such portion.

At 714, after determining the starting segment/timepoint for each selected portion, the media application may identify URLs for each selected portion based on the manifest and/or key moments table. For example, control circuitry (e.g., control circuitry 504 of computing device 500 of FIG. 5 and/or control circuitry 611 of FIG. 6) may perform the identifying of such URLs. For instance, if control circuitry determines that the portion corresponding to "The Slap" starts at first segment 302 (or timepoint t(1)) and the portion corresponding to "LIVE" starts at live segment 307, the control circuitry may identify Link 1 322 to retrieve first segment 302 and live link 329 to retrieve live segment 307. In some embodiments, when the control circuitry determines the starting segment/timepoint based on key moments table 400, control circuitry locates the URL of first segment of first manifest file 422, e.g., corresponding to the portion "The Slap." Such URLs specified in the manifest may be used to retrieve video segments corresponding to the selected portions of the media asset.

At 716, the media application may buffer, decode, and simultaneously display to the user (e.g., associated with user profile 125 of FIG. 1A) the selected portions of the media asset in a composite multi-view layout in mosaic mode, and the media application may periodically update the manifest file (e.g., manifest file 300 of FIG. 3 and/or manifest file 422 or 424 of FIG. 4). Buffered content of the media asset may be stored in local storage (e.g., storage 508 of device 500 of FIG. 5). For example, after locating the URLs for each respective starting segment for portions corresponding to "LIVE" and "The Slap," the control circuitry (e.g., control circuitry 504 of device 500 of FIG. 5) of the computing device may buffer, decode, and display portions of "LIVE" and "The Slap" in a dual-view configuration. In some embodiments, the manifest can be parsed, and segments can be requested and decoded, upon determining that the manifest references valid segments with an IDR frame (and an initialization segment is signaled when appropriate).

In some embodiments, the media asset corresponds to a real-time (or near real-time) live event, in which case the media application may periodically update the dynamic live manifest file (e.g., manifest file 300 of FIG. 3, first manifest file 422 or second manifest file 424 of FIG. 4) with new segments (e.g., live segment 307) corresponding to the real-time (or near real-time) portion of the live event, and/or metadata for previously occurring segments corresponding to key moments from earlier portions in the live event. In some embodiments, the media asset corresponds to a previously transmitted event, in which case the content server transmits the entire manifest file upon receiving a request for the media asset at the user device. A request for the media asset may be a request to view the media asset or a request to store the media asset at the user device. In some embodiments, while in mosaic mode, the fetching of content for one portion (e.g., live stream) of the media asset is prioritized over fetching other content due to network constraints and/or computing device processing constraints.

At 718, the media application may determine whether a request to modify the configuration portion windows in mosaic mode has been received from the user (e.g., the user associated with user profile 125 of FIG. 1A) or whether a request to stop displaying a portion presented in one of the portion windows has been received. For example, if I/O circuitry (e.g., I/O circuitry 502 of computing devices 500, 501 of FIG. 5 and/or I/O circuitry 612 of content server 604 of FIG. 6) receives one or more of such requests, processing may return to 710 and the media application may determine the appropriate configuration based on the user request and/or the number of selected portions. For instance, after receiving an input (e.g., a remote-control input, touchscreen input, voice input or any other suitable input, or any combination thereof) at user input interface 510 or microphone 516, e.g., corresponding to configuration selector icon 278 of FIG. 2B, the control circuitry may determine that the user has requested to modify the dual-view configuration of displayed portions, "LIVE" and "The Slap," to a PiP configuration. The control circuitry may subsequently cause the configuration to be modified to such PiP configuration, based on determining that the user requested to change the dual-view configuration to a PiP configuration. In some embodiments, the portion assigned to the primary window of the PiP configuration may be selected based on having a higher importance ranking (e.g., importance ranking 342 of FIG. 3 and/or importance ranking 418 of FIG. 4) than the other displayed portion or based on user input indicating which portion should be the primary portion to be displayed in a larger area of the display.

In some embodiments, the media application may receive a request from the user to, for example, alter the number of views by adding or deleting a view, choose a different set of views or choose a different layout for rendering and presentation at any time while in multi-viewing mode. If the media application (e.g., executing at the client device) receives a command to alter the multi-view configuration, the media application may recalculate the representations to be requested and begin requesting an altered set of streams, e.g., from different starting points and with different representations using the URL references in the manifest. Similarly, if the media application receives a request from the user choosing an audio source associated with a different view, the client chooses a different URL for retrieving audio based on the current timestamp of the chosen view.

At 720, the media application may determine whether one of the displayed portions has reached a stop condition. In some embodiments, control circuitry (e.g., control circuitry 504 of device 500 of FIG. 5 or control circuitry of the content server 604 of FIG. 6) of the computing device determines that a displayed portion has reached its stop condition, if the next segments in the referenced manifest file (e.g., manifest file 300 of FIG. 3) no longer comprise an indication of the key moments tag (e.g., key moment tags 314, 332 of FIG. 3) associated with the displayed portion. For example, if the control circuitry displays the portion corresponding to "The Slap" by referencing manifest file 300, the control circuitry may determine that such portion reaches its stop condition right before segment 306, since segment 306 no longer contains the key moment tag, "The Slap." It should be appreciated that if a key moment tag changes between advertisement markers, the control circuitry may detect the stop condition after displaying supplemental content associated with the advertisement markers.

In some embodiments, the control circuitry may determine, based on a manifest file (e.g., first manifest file 422 or second manifest file 424 of FIG. 4), that a particular displayed portion has reached its stop condition when such manifest file no longer contains any segments. For instance, if the control circuitry causes display of the portion of the media asset corresponding to "The Slap" by referencing first manifest file 422, the control circuitry may determine that the portion reaches its stop condition when it reaches the last segment (e.g., segment 426) in first manifest file 422, as shown in FIG. 4. Such features may reduce latency in determining whether the displayed portion has reached its stop condition.

In some embodiments, if the control circuitry does not determine that a displayed portion has reached its stop condition, processing may return to 716 and the control circuitry may continue to buffer, decode, and simultaneously display portions in a suitable configuration. In some embodiments, the control circuitry may monitor which portions of the media asset are being displayed and a starting segment/timepoint for each respective displayed portion, such that when a displayed portion reaches the starting segment/timepoint of an already displayed portion (e.g., if "The Slap" catches up to a timepoint associated with "Supporting Actress" or a timepoint having been previously displayed as the live portion), the control circuitry may also identify this as a stop condition for the displayed portion and may subsequently stop displaying such portion.

At 722, after determining that a portion has reached its stop condition, the media application may stop generating for display the displayed portion that reached the stop condition and remove the portion window from the user interface (e.g., user interface 200 of FIG. 2A or user interface 250 of FIG. 2B). In some embodiments, instead of removing the portion window, control circuitry (e.g., control circuitry 504 of device 500 of FIG. 5) of the computing device displays a new portion in the portion window so that the configuration of displayed portions may stay the same. If the control circuitry displays a new portion in place of the stopped portion, the control circuitry may return to 716 and buffer, decode, and simultaneously display portions in a suitable configuration.

In some embodiments, upon completion of the presentation of a particular portion or key moment of the media asset, a window of the media application at which the live stream is being played may become the sole player for video consumption. In some embodiments, the client monitors the start time of each stream in the multi-view mode, and when the stream that starts at the earliest time reaches the start time of another stream that is being viewed, the client may turn off the first stream.

At step 724, the media application may automatically select a new portion for display, provide options to display new portions, or exit mosaic mode. For example, control circuitry (e.g., control circuitry 504 of device 500 of FIG. 5 and/or control circuitry 611 of server 604 of FIG. 6) may determine a key moment portion that has not been provided for display and automatically provides such portion for display in the portion window of the stopped portion. In some embodiments, the control circuitry may also provide a user interface (e.g., user interface 100 of FIG. 1A or user interface 122 of FIG. 1B) to allow the user to select new portions manually, if control circuitry determines that a displayed portion has reached a stop condition. In some embodiments, the control circuitry may exit mosaic mode for the media asset if the user manually requests it, or if there are no more displayed portions and control circuitry cannot identify new portions to display.

In some embodiments, another portion or view may be brought up to speed with a live video by fast-forwarding to the present time. If a stream runs to completion or a stop condition, then the media may decide to change the multi-view layout configuration so that the screen area is utilized for the highest fidelity viewing. For example, if one of the streams in dual-viewing mode runs to completion, then the client may switch to a single view for the stream that is currently in motion, which may trigger a recalculation of representations of the remaining streams to be requested.

Figure 8:
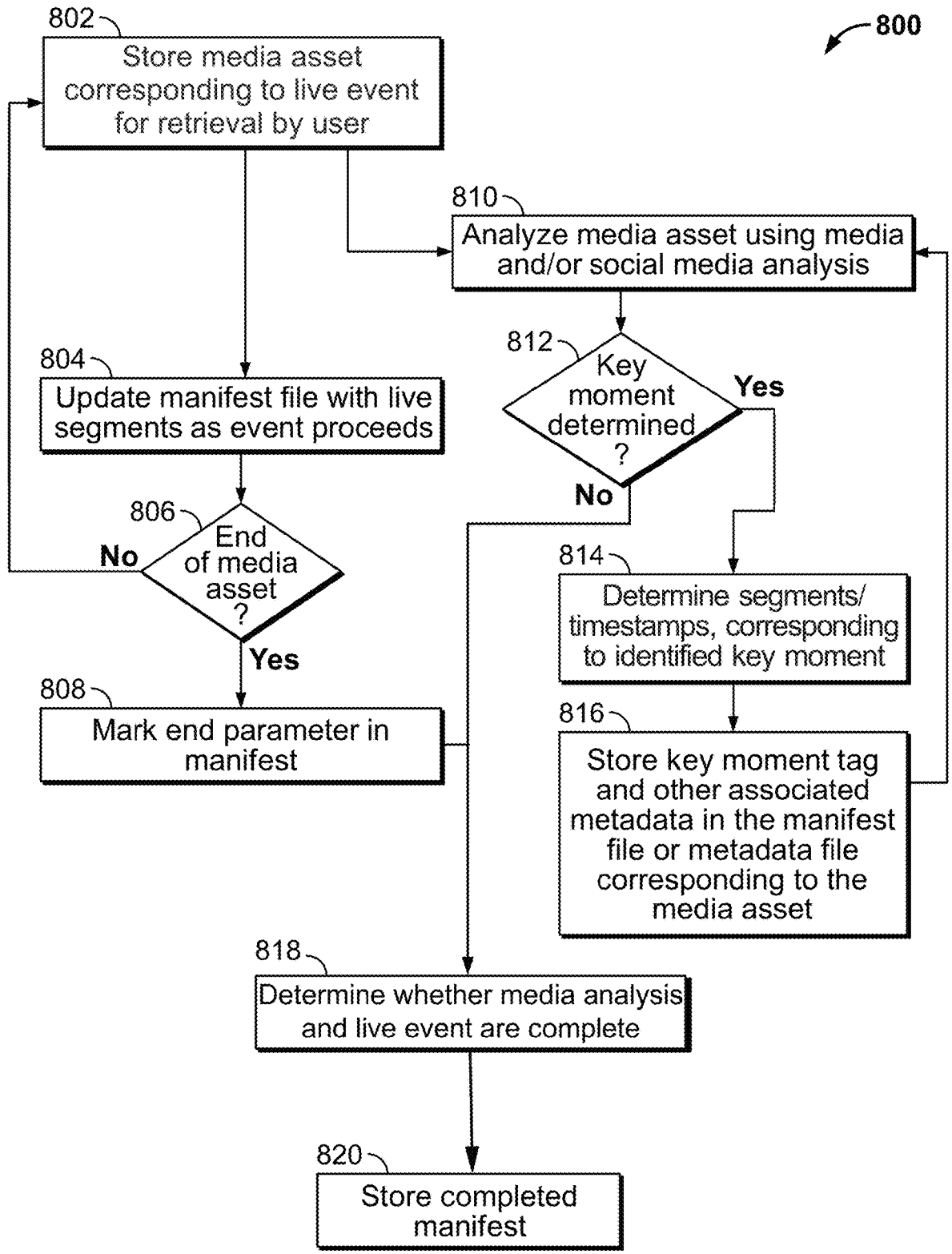
FIG. 8 is a flowchart of a detailed illustrative process for causing simultaneous display of portions of a media asset, in accordance with some embodiments of this disclosure.

FIG. 8 is a flowchart of a detailed illustrative process 800 for causing simultaneous display of portions of a media asset, in accordance with some embodiments of this disclosure. In various embodiments, the individual steps of process 800 may be implemented by one or more components of the devices, systems, and methods of FIGS. 1-7 and 9. Although the present disclosure may describe certain steps of process 800 (and of other processes described herein) as being implemented by certain components of the devices, systems, and methods of FIGS. 1-7 and 9, this is for purposes of illustration only, and it should be understood that other components of the devices, systems, and methods of FIGS. 1-7 and 9 may implement those steps instead.

At 802, the media application may store a media asset corresponding to a live event, such that a user (e.g., using computing devices 607, 608 or 610 of FIG. 6) may retrieve the media asset by requesting it from their device. For example, such media asset may be an ongoing live event, and portions of the live event that have already occurred may be stored at storage 614 and/or content database 605 of FIG. 6 and/or at storage 508 of computing device 500 of FIG. 5.

For example, to enable time-shifted multi-viewing mode for users, the media application may record and store an encoded video stream (e.g., corresponding to media asset 103 of FIG. 1A) on a server (e.g., media content source 602 of FIG. 6 and/or content server 604 of FIG. 6) to make such encoded video stream available for streaming or to be otherwise provided to users of client devices, e.g., to users who may desire to view the media asset from the beginning or from another point in time by using trick play to navigate to such time. The media application may concurrently update the dynamic manifest file for live streaming, and/or analyze the recorded video for key moments. In some embodiments, analysis of the recorded and/or live content can also occur prior to recording (e.g., at an ingestion phase).

In some embodiments, the video analysis may be performed in real time or near real time using techniques in the video processing domain, or by analyzing social media or another source that is correlated with or related to the media asset (e.g., media asset 103 of FIG. 1A), to allow key moments to be identified and timestamped as they occur, to maximize the user's optionality in selecting times from which to start watching portion(s) of the content. In some embodiments, when a key moment is identified, a reference to such key moment may be stored in a data structure (e.g., key moments table(s) 330, 344, 400 or portions thereof) along with parameters usable to recall the beginning of the media asset and/or other portions of the media asset (e.g., timepoint, period ID, segment number or any other suitable data, or any combination thereof. In some embodiments, metadata such as, for example, title, description, thumbnail image (or any other suitable metadata, or any combination thereof) may be stored in the key moments table and may be retrieved for presentation to the user for selection when the user invokes the multi-viewing mode.

At 804, the media application may update the manifest file associated with the media asset with metadata associated with segments corresponding to the real-time portion of the live event. For example, control circuitry 611 of content server 604 of FIG. 6 (or control circuitry 504 of computing device 500, 501 of FIG. 5) may perform the updating of the manifest file.

At 806, the media application may determine if the transmission (e.g., through broadcast, streaming, or any other suitable transmission method) of the media asset (which may correspond to a stream or broadcast of a live event, such as, for example, "The Academy Awards 2022" as indicated in FIG. 1A) has ended. For example, control circuitry 611 of content server 604 and/or control circuitry 504 of computing device 500, 501 may perform such determination. In response to determining that the transmission of the live event has not ended, processing may return to 802; otherwise, processing may proceed to 808.

At 808, after determining that the transmission of the live event has ended, the media application may mark an end parameter in the manifest file, to enable the media application running on a user device to detect when to stop displaying the media asset. For example, control circuitry 611 of content server 604 of FIG. 6 (and/or control circuitry 504 of computing device 500, 501) may perform the marking so that computing devices 607, 608, 610 of FIG. 6 or device 500 of FIG. 5 may detect end parameters when using the manifest file to play the media asset corresponding to the live event.

At 810, the media application may analyze the media asset associated with the live event using audiovisual and/or social media analysis and/or any other suitable technique(s). For example, control circuitry 611 of content server 604 and/or media content source 602 (and/or control circuitry 504 of computing device 500, 501) may perform the analyzing. In some embodiments, the media application may employ video summarization and scene-understanding technology including object recognition, facial recognition, semantic segmentation, video skimming, NLP, and/or any other suitable processing. In some embodiments, control circuitry 611 of content server 604 or another suitable analysis system (e.g., media content source 602 of FIG. 6) analyzes content related to the media asset such as social media activity (e.g., posts, searches, likes, or other suitable social media data values) or information from another external source to generate or identify metadata for the manifest file.

In some embodiments, the media application may analyze the media asset based on metadata (e.g., automatically generated or manually curated) and/or popularity of the media asset or portion(s) thereof and/or user preference of a user consuming the media asset. For example, control circuitry 611 may analyze the media asset corresponding to "The Academy Awards 2022," and determine based on scene-understanding technology and NLP that a conflict (e.g., a slap and uttered expletives) occurred between people participating in the event. Based on the contextual knowledge, control circuitry 611 of FIG. 6 (and/or control circuitry 504 of FIG. 5) may determine that a conflict is a unique and noteworthy portion of an awards show such as "The Academy Awards 2022."

In some embodiments, control circuitry 611 of content server 604 or another suitable analysis system may analyze social media activity and identify a plurality of posts including terms such as "Will Smith," "Chris Rock," "The Slap," and determine that the identified plurality of posts is related to a particular portion of interest. Based on the number of posts with the associated terms and/or the level of activity associated with each post, control circuitry 611 may determine that the identified portion is a key moment in "The Academy Awards 2022." In some embodiments, metadata associated with the event and the corresponding media asset may also influence the importance ranking (e.g., importance ranking 342 of FIG. 3 and importance ranking 418 of FIG. 4) associated with each portion of the media asset. For instance, the media application may determine a high number of posts and user engagement associated with a particular key moment event and subsequently calculate a high importance ranking for that respective key moment portion.

At 812, the media application may determine whether it identified a key moment. For example, control circuitry 611 of content server 604 of FIG. 6 (and/or control circuitry 504 of FIG. 5) may perform the determining. If control circuitry 611 identifies the key moment, the control circuitry may, at 814, determine segments/timepoints corresponding to the identified key moment. For example, after determining that "The Slap" is a key moment, control circuitry 611 of FIG. 6 (and/or control circuitry 504 of FIG. 5) determines that timepoints t(1)-t(2) 310 corresponding to the first segment are associated with "The Slap."

At 816, the media application may store the key moment tag associated with the identified key moment and other associated metadata in the manifest file (e.g., manifest file 300 of FIG. 3) or key moments table (e.g., key moments table 400 of FIG. 4) corresponding to the media asset. For example, control circuitry 611 of content server 604 of FIG. 6 (and/or control circuitry 504 of FIG. 5) may perform the storing. In some embodiments, other associated metadata comprises social media tags 336, 412, object recognition tags 338, 414, and/or additional metadata tags 340, 416 of FIGS. 3-4. In some embodiments, other associated metadata may be determined based on analysis of media and social media (or any other suitable external source). The additional metadata may be used to generate a description, title, thumbnail image and any other suitable identifiers (e.g., for the social media tags 336, object recognition tags 338, additional metadata tags 340) corresponding to the identified key moment. In some embodiments, additional metadata may comprise the description, title, and/or thumbnail image.

After storing the key moment tag associated with the identified key moment and other associated metadata, control processing may return to 810, and the media application may continue analyzing the media asset using audiovisual and/or social media analysis, in order to identify another key moment in the media asset. If no key moments are identified, processing may proceed to 818.

At 818, the media application may determine that audiovisual analysis and the transmission of the media asset associated with the live event are complete and, at 820, store the completed manifest at the content server or any other suitable storage location. For example, control circuitry 611 of content server 604 may store the manifest at storage 614 and/or content database 605 of FIG. 6 and/or at storage 508 of computing device 500 or 501. Such stored manifest file may be used by one or more users in a subsequent multi-viewing session to simultaneously view multiple portions of a media asset.

FIG. 9 is a flowchart 900 of a detailed illustrative process for causing simultaneous display of portions of a media asset, in accordance with some embodiments of this disclosure. In various embodiments, the individual steps of process 900 may be implemented by one or more components of the devices, systems, and methods of FIGS. 1-8. Although the present disclosure may describe certain steps of process 900 (and of other processes described herein) as being implemented by certain components of the devices, systems, and methods of FIGS. 1-8, this is for purposes of illustration only, and it should be understood that other components of the devices, systems, and methods of FIGS. 1-8 may implement those steps instead.

At 902, the media application may receive a request to access a media asset (e.g., media asset 103 of FIG. 1). For example, I/O circuitry 612 of content server 604 may receive the request to access the media asset from a computing device (e.g., computing device 104 of FIG. 1A), e.g., based on the user selecting icon 156 of FIG. 1C. In some embodiments, the media asset may be a stream or broadcast of an ongoing live event that the user is joining after a start time of the media asset.

At 904, the media application provides for display the first portion (e.g., a live portion indicated at 129 in FIG. 1B) of the media asset corresponding to a first timepoint (e.g., timepoint 117 shown in FIG. 1A) of the media asset (e.g., media asset 103 of FIG. 1A). For example, I/O circuitry 612 of content server 604 may transmit the first portion of the media asset to one of computing device 104 of FIG. 1A-1B. In some embodiments, providing for display the first portion comprises causing display of a video at 105, or causing display of the live portion under user interface 100. In some embodiments, the first portion is other than a live portion (e.g., the first portion may be the "Supporting Actress" portion indicated at 116. In some embodiments, the media application may refrain from displaying the first portion, until it simultaneously displays the first portion with one or more identified portions as discussed in more detail in connection with step 916.

At 906, the media application (e.g., executing at content server 604 of FIG. 6 and/or control circuitry 504 of computing device 500) may access metadata associated with the media asset. For example, the media application may access metadata embedded in a manifest file (e.g., manifest file 300 of FIG. 3 and/or manifest file 422 or 424 in FIG. 4) associated with the media asset (e.g., media asset 103 of FIG. 1A) or may access the metadata from a separate key moments table (e.g., data structure 400 of FIG. 4). In some embodiments, the key moments table may be populated based on the analysis discussed in relation to 810 of FIG. 8 (e.g., based on analyzed audio or video attributes of the content, popularity of the content or portions thereof, interests of the user, social media activity, or other suitable factors, or any combination thereof) to generate importance rankings for each portion of the media asset.

At 908, the media application (e.g., executing at content server 604 of FIG. 6 and/or control circuitry 504 of computing device 500) may determine whether one or more portions of the media asset likely to be of interest to the user (e.g., a user associated with user profile 125 consuming media asset 103 at computing device 104 of FIG. 1A) have been identified based on importance rankings associated with each respective portion. For example, the media application may identify one or more portions (e.g., "The Slap" and "Supporting Actress") having importance scores of 0.8 and 0.6, as shown at 418 of FIG. 4) as portions of interest based on such portion(s) having an importance score that exceeds a threshold (e.g., 0.5), or based on such portion(s) having the highest importance score from among a plurality of importance scores computed for the media asset. If the media asset application identifies one or more portions of the media asset likely to be of interest to the user at 908, processing may proceed to 910.

In some embodiments, if the media application determines that one or more portions likely to be of interest have not been identified (e.g., each is associated with an importance score that is below the importance threshold), processing may return to 904. For instance, if a user tunes in to a media asset for a live event that has just begun, the media application may determine that no key moments have occurred, or may provide an option to return to the beginning along with a live portion of the content. In other words, in some embodiments, the media application may continue to provide for display the first portion which may correspond to the live portion of the event, until it identifies one or more additional portions.

At 910, the media application (e.g., executing at control circuitry 611 of content server 604 of FIG. 6 or control circuitry 504 of computing device 500 of FIG. 5) may cause display of an option to provide simultaneous display of the first portion and the one or more of the identified portions (e.g., 105, 106, 107 and 108 and/or 109, 110, 111 and 112 and/or other suitable options in FIGS. 1A-1B and 2A-2B). For example, control circuitry 611 of content server 604 of FIG. 6 (or control circuitry 504 of computing device 500 of FIG. 5) may cause display of an option to provide simultaneous display of the first portion and the one or more of the identified portions (e.g., "The Beginning" indicated at 106, "The Slap" indicated at 107, and/or "Supporting Actress" indicated at 108, as shown in FIG. 1A). In some embodiments, such simultaneous display of the first portion and the one or more of the identified portions may be performed without receiving selection of such option, e.g., automatically based on importance rankings and/or user preferences.

At 912, the media application (e.g., executing at control circuitry 611 of content server 604 of FIG. 6 or control circuitry 504 of computing device 500 of FIG. 5) may determine whether selection of an option has been received, e.g., within a threshold period of time (e.g., 30 seconds). For example, the media application may determine whether one or more of selectable icons 105, 106, 107, 108; selection indicator 109, 110, 111, 112; and/or icon 121 are selected, and if so, may proceed to 916. If the media application does not receive a selection it may proceed to 913.

At 913, the media application (e.g., executing at control circuitry 611 of content server 604 of FIG. 6 or control circuitry 504 of computing device 500 of FIG. 5) may determine whether the user has configured or allowed the media application to automatically display one or more portions. If the media application is not configured or allowed to automatically display one or more portions, processing may return to 904 to continue to provide for display the first portion of the media asset. If the media application is configured or allowed to automatically display one or more portions, processing may proceed to 914 where simultaneous display of the first portion and the one or more of the identified portions may be performed without receiving selection of such option, e.g., automatically based on importance rankings and/or user preferences.

At 916, the media application (e.g., executing at control circuitry 611 of content server 604 of FIG. 6 or control circuitry 504 of computing device 500 of FIG. 5) may provide for simultaneous display the first portion and the one or more identified portions based on the user selection. For example, a live portion may be presented at a region of user interface 200 associated with window 202, and other portions (e.g., "The Beginning" 228, "The Slap" 230 and/or "Supporting Actress" 232) may be displayed at other regions of user interface 200 as shown in FIG. 2A, or the configuration shown in FIG. 2B may be caused to be displayed.

At 918, the media application (e.g., executing at control circuitry 611 of content server 604 of FIG. 6 or control circuitry 504 of computing device 500 of FIG. 5) may determine whether a particular portion of the media asset has reached a stop condition. If not, processing may return to 916; otherwise, processing may proceed to 920. In some embodiments, the stop condition may correspond to an end of a portion of the media asset, or an end of a particular event associated with that portion. For instance, the media application may determine that a particular portion has reached a stop condition because it has reached the last segment of the respective portion manifest file or because the subsequent segments in the manifest file no longer comprise the key moment tag corresponding to the respective portion. In some embodiments, the stop condition may correspond to the respective portion reaching a timepoint of an already displayed portion. For instance, the media application may detect that the second portion has reached a stop condition when the second portion has reached content already displayed to the user via the first portion.

At 920, the media application may modify the window corresponding to the particular portion that reached a stop condition. For example, control circuitry 611 of content server 604 may modify the window. In some embodiments, modifying the window comprises replacing the particular portion that reached a stop condition with a new identified portion that has not yet been provided for display. In some embodiments, modifying the window comprises causing the window to be removed from the user interface for simultaneously displaying the one or more portions. The media application may modify the configuration of remaining windows based on causing the window of the particular portion to be removed. In some embodiments, the media application modifies the window of the particular portion based on user input. For example, a user may request the media application to start displaying a specific desired portion or request a different configuration of windows for the windows with remaining displayed portions. In some embodiments, the media application automatically modifies the window for the particular portion, e.g., based on the importance ranking associated with each respective portion.

In some embodiments, once a stream concludes or is closed or otherwise catches up to content already shown to the user, the media application may cause a window displaying such stream to collapse or disappear, and/or may provide options to rewatch such portion or watch another portion, or may automatically add another stream to the simultaneous display based on an importance ranking of the stream, and/or may reconfigure the existing windows to occupy space previously occupied by the now-closed window.

In some embodiments, e.g., if the media asset is a sports game, the media application may determine that a timeout or lull in action is occurring, and, based on such determination, may switch a window displaying such portion to a less prominent position or smaller size on the user interface (along with deactivating its audio source). On the other hand, if the media application determines that a particular portion is showing content likely to be of interest to the user, the media application may switch a window displaying such portion to a more prominent position or larger size on the user interface (along with activating its audio source).

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
   receiving a first request to access a media asset;
   identifying a first portion of the media asset to be provided for display based on the first request, wherein the first portion of the media asset corresponds to a first timepoint of the media asset;
   identifying a second portion of the media asset corresponding to a second timepoint of the media asset, wherein the second timepoint occurs prior to the first timepoint of the media asset;
   receiving a second request to cause simultaneous display of the first portion of the media asset corresponding to the first timepoint and the second portion of the media asset corresponding to the second timepoint;
   based on receiving the second request, providing for simultaneous display a first window at a first region of a display and a second window at a second region of the display, wherein the first window displays the first portion of the media asset and the second window displays the second portion of the media asset, wherein the second portion of the media asset corresponds to video content corresponding to the second timepoint of the media asset;
   determining, based on a current timepoint of the second portion of the media asset, to modify the second window of the display by determining that the second portion of the media asset has concluded or by determining that the current timepoint of the video content of the second portion of the media asset corresponds to the first timepoint of the first portion of the media asset; and
   modifying the second window of the display by removing the second window from the display.

2. The method of claim 1, wherein:
   the method further comprises:
   accessing metadata of a plurality of portions of the media asset occurring at timepoints prior to the first timepoint of the media asset, wherein the plurality of portions of the media asset comprise the second portion of the media asset;
   generating, based on the metadata and for each of the plurality of portions of the media asset, an importance ranking;
   based on the importance ranking for the second portion of the media asset, providing for display a selectable option; and
   receiving the second request based on receiving a selection of the selectable option.

3. The method of claim 2, wherein the metadata is generated based on at least one of analyzing audio of the second portion of the media asset, analyzing video of the second portion of the media asset, or analyzing social media content related to the second portion of the media asset.

4. The method of claim 2, wherein:
   the second request is received from a user associated with a user profile; and
   the method further comprises:
   accessing preferences of the user profile;
   determining, based on comparing at least a portion of the accessed metadata to the preferences of the user profile, that the second portion of the media asset is likely to be of interest to the user; and
   based on determining that the second portion of the media asset is likely to be of interest to the user, providing for display the selectable option.

5. The method of claim 2, wherein:
   providing for display the selectable option comprises providing for display a plurality of selectable icons respectively corresponding to a plurality of portions of the media asset; and
   providing for simultaneous display the first portion of the media asset and the second portion of the media asset is performed based on receiving selection of a first icon of the plurality of icons corresponding to the first portion of the media asset and a second icon of the plurality of icons corresponding to the second portion of the media asset.

6. The method of claim 2, wherein:
   providing for display the selectable option comprises, while providing for display the first portion of the media asset corresponding to the first timepoint of the media asset, providing for display a plurality of selectable icons respectively corresponding to a plurality of portions of the media asset occurring prior to the first timepoint of the media asset; and
   providing for simultaneous display the first portion of the media asset and the second portion of the media asset is performed based on receiving selection of an icon of the plurality of icons corresponding to the second portion of the media asset.

7. The method of claim 1, wherein:
   the first timepoint corresponds to a live portion of the media asset, and the second timepoint corresponds to a beginning of the media asset; and
   providing for simultaneous display the first portion of the media asset and the second portion of the media asset comprises causing simultaneous playing of the media asset starting from the live portion of the media asset and starting from the beginning of the media asset at a same computing device.

8. The method of claim 1, further comprising:
   identifying a third portion of the media asset corresponding to a third timepoint of the media asset occurring prior to the first timepoint of the media asset, wherein modifying the second window of the display comprises causing the third portion of the media asset to be provided for display at the second region of the display after the second portion of the media asset has concluded.

9. The method of claim 1, wherein the first portion of the media asset and the second portion of the media asset are provided for display based on a single dynamic manifest file.

10. The method of claim 1, wherein the first portion of the media asset is provided for display based on a first manifest file and the second portion of the media asset is provided for display based on a second manifest file.

11. The method of claim 1, wherein determining, based on the current timepoint of the second portion of the media asset, to modify the second window of the display by determining that the second portion of the media asset has concluded.

12. A computer-implemented method comprising:
receiving a first request to access a media asset;
identifying a first portion of the media asset to be provided for display based on the first request, wherein the first portion of the media asset corresponds to a first timepoint of the media asset;
identifying a second portion of the media asset corresponding to a second timepoint of the media asset, wherein the second timepoint occurs prior to the first timepoint of the media asset;
receiving a second request to cause simultaneous display of the first portion of the media asset corresponding to the first timepoint and the second portion of the media asset corresponding to the second timepoint;
based on receiving the second request, providing for simultaneous display the first portion of the media asset and the second portion of the media asset;
identifying supplemental content to be provided for display during the first portion of the media asset; and
preventing display of the supplemental content during the second portion of the media asset.

13. A computer-implemented system comprising:
input/output (I/O) circuitry configured to:
receive a first request to access a media asset; and
control circuitry configured to:
identify a first portion of the media asset to be provided for display based on the first request, wherein the first portion of the media asset corresponds to a first timepoint of the media asset; and
identify a second portion of the media asset corresponding to a second timepoint of the media asset, wherein the second timepoint occurs prior to the first timepoint of the media asset;
wherein the I/O circuitry is further configured to:
receive a second request to cause simultaneous display of the first portion of the media asset corresponding to the first timepoint and the second portion of the media asset corresponding to the second timepoint; and
wherein the control circuitry is further configured to:
based on receiving the second request, provide for simultaneous display a first window at a first region of a display and a second window at a second region of the display, wherein the first window displays the first portion of the media asset and the second window displays the second portion of the media asset, wherein the second portion of the media asset corresponds to video content corresponding to the second timepoint of the media asset;
determine, based on a current timepoint of the second portion of the media asset, to modify the second window of the display by determining that the second portion of the media asset has concluded or by determining that the current timepoint of the video content of the second portion of the media asset corresponds to the first timepoint of the first portion of the media asset; and modify the second window of the display by removing the second window from the display.

14. The system of claim 13, wherein:
the control circuitry is further configured to:
access metadata of a plurality of portions of the media asset occurring at timepoints prior to the first timepoint of the media asset, wherein the plurality of portions of the media asset comprise the second portion of the media asset;
generate, based on the metadata and for each of the plurality of portions of the media asset, an importance ranking; and
based on the importance ranking for the second portion of the media asset, provide for display a selectable option; and
the I/O circuitry is further configured to:
receive the second request based on receiving a selection of the selectable option.

15. The system of claim 14, wherein the control circuitry is configured to generate the metadata based on at least one of analyzing audio of the second portion of the media asset, analyzing video of the second portion of the media asset, or analyzing social media content related to the second portion of the media asset.

16. The system of claim 14, wherein:
the I/O circuitry is configured to receive the second request from a user associated with a user profile; and
the control circuitry is further configured to:
access preferences of the user profile;
determine, based on comparing at least a portion of the accessed metadata to the preferences of the user profile, that the second portion of the media asset is likely to be of interest to the user; and
based on determining that the second portion of the media asset is likely to be of interest to the user, provide for display the selectable option.

17. The system of claim 14, wherein the control circuitry is configured to:
provide for display the selectable option by providing for display a plurality of selectable icons respectively corresponding to the plurality of portions of the media asset; and
provide for simultaneous display the first portion of the media asset and the second portion of the media asset based on receiving selection of a first icon of the plurality of selectable icons corresponding to the first portion of the media asset and a second icon of the plurality of selectable icons corresponding to the second portion of the media asset.

18. The system of claim 14, wherein the control circuitry is configured to:
provide for display the selectable option by, while providing for display the first portion of the media asset corresponding to the first timepoint of the media asset, providing for display a plurality of selectable icons respectively corresponding to the plurality of portions of the media asset occurring prior to the first timepoint of the media asset; and
provide for simultaneous display the first portion of the media asset and the second portion of the media asset based on receiving selection of an icon of the plurality of selectable icons corresponding to the second portion of the media asset.

19. The system of claim 13, wherein:
the first timepoint corresponds to a live portion of the media asset, and the second timepoint corresponds to a beginning of the media asset; and the control circuitry is configured to provide for simultaneous display the first portion of the media asset and the second portion of the media asset by causing simultaneous playing of the media asset starting from the live portion of the media asset and starting from the beginning of the media asset at a same computing device.

20. The system of claim 13, wherein the control circuitry is configured to determine, based on the current timepoint of the second portion of the media asset, to modify the second window of the display by determining that the second portion of the media asset has concluded.

\* \* \* \* \*